(12) United States Patent
Yokoyama et al.

(10) Patent No.: US 12,460,285 B2
(45) Date of Patent: Nov. 4, 2025

(54) STEEL SHEET

(71) Applicant: NIPPON STEEL CORPORATION, Tokyo (JP)

(72) Inventors: Takafumi Yokoyama, Tokyo (JP); Kazuki Shiokawa, Tokyo (JP); Tatsuya Obuchi, Tokyo (JP); Kunio Hayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 724 days.

(21) Appl. No.: 17/634,229

(22) PCT Filed: Sep. 3, 2020

(86) PCT No.: PCT/JP2020/033489
§ 371 (c)(1),
(2) Date: Feb. 9, 2022

(87) PCT Pub. No.: WO2021/045168
PCT Pub. Date: Mar. 11, 2021

(65) Prior Publication Data
US 2022/0275493 A1    Sep. 1, 2022

(30) Foreign Application Priority Data

Sep. 3, 2019  (JP) ................. 2019-160683

(51) Int. Cl.
*C22C 38/60* (2006.01)
*C21D 8/02* (2006.01)
(Continued)

(52) U.S. Cl.
CPC ............ *C22C 38/60* (2013.01); *C21D 8/0205* (2013.01); *C21D 8/0226* (2013.01);
(Continued)

(58) Field of Classification Search
CPC .......... B22D 11/225; C21D 1/19; C21D 1/22; C21D 1/25; C21D 1/76; C21D 2211/001;
(Continued)

(56) References Cited

U.S. PATENT DOCUMENTS 10,870,902 B2 * 12/2020 Ono ....................... C22C 38/00
2018/0100212 A1   4/2018 Ono et al.
(Continued)

FOREIGN PATENT DOCUMENTS

JP     2016-50343 A    4/2016
JP     2016-153524 A   8/2016
(Continued)

*Primary Examiner* — Jie Yang
(74) *Attorney, Agent, or Firm* — SOLARIS Intellectual Propery Group, PLLC

(57) ABSTRACT

Provided are a steel sheet having a predetermined chemical composition and having the following steel structure, and a method of manufacturing the steel sheet.
(1) In area ratio %, ferrite: 0 to 5%, martensite: 90 to 100%, a ratio of tempered martensite to total martensite: 80 to 100%, and retained austenite: 0.5 to 6.0% are contained.
(2) The number density of inclusions satisfying the maximum diameter≥3 μm is 40 inclusions/mm² or less.
(3) When the number density of the inclusions satisfying the maximum diameter≥3 μm in each section is calculated, the number density in the section where the number density of inclusions is in the top 10% is 80 inclusions/mm² or less.
(4) Formula (A) is satisfied.

$$V\gamma'/V\gamma \geq 0.1 \quad\quad (A)$$

Vγ: Initial retained austenite, Vγ': Retained austenite after deep cooling at −196° C.
(5) The tensile strength is 1470 MPa or more.

7 Claims, 3 Drawing Sheets

(51) Int. Cl.
  *C21D 9/46* (2006.01)
  *C22C 38/00* (2006.01)
  *C22C 38/02* (2006.01)
  *C22C 38/04* (2006.01)
  *C22C 38/06* (2006.01)
  *C22C 38/08* (2006.01)
  *C22C 38/10* (2006.01)
  *C22C 38/12* (2006.01)
  *C22C 38/14* (2006.01)
  *C22C 38/16* (2006.01)
  *C22C 38/42* (2006.01)
  *C22C 38/44* (2006.01)
  *C22C 38/48* (2006.01)
  *C22C 38/50* (2006.01)
  *C22C 38/54* (2006.01)
  *C22C 38/58* (2006.01)

(52) U.S. Cl.
  CPC ........ *C21D 8/0236* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/42* (2013.01); *C22C 38/44* (2013.01); *C22C 38/48* (2013.01); *C22C 38/50* (2013.01); *C22C 38/54* (2013.01); *C22C 38/58* (2013.01); *C21D 2211/001* (2013.01); *C21D 2211/005* (2013.01); *C21D 2211/008* (2013.01)

(58) Field of Classification Search
  CPC ........ C21D 2211/004; C21D 2211/005; C21D 2211/008; C21D 8/0205; C21D 8/021; C21D 8/0226; C21D 8/0236; C21D 8/0247; C21D 8/0263; C21D 9/46; C22C 38/00; C22C 38/001; C22C 38/50; C22C 38/54; C22C 38/02; C22C 38/04; C22C 38/06; C22C 38/14
  See application file for complete search history.

(56) References Cited

U.S. PATENT DOCUMENTS

| 2019/0153575 A1 | 5/2019 | Shibata et al. |
| 2019/0203317 A1 | 7/2019 | Yoshioka et al. |

FOREIGN PATENT DOCUMENTS

| JP | 6295893 B2 | 3/2018 |
| WO | 2016/152163 A1 | 9/2016 |
| WO | 2018/062381 A1 | 4/2018 |

* cited by examiner

STEEL SHEET

TECHNICAL FIELD

The present disclosure relates to a steel sheet.

BACKGROUND ART

In recent years, improvement in fuel efficiency of automobiles has been required from the viewpoint of greenhouse gas emission regulations accompanying global warming countermeasures, and application of high-strength steel sheets for weight reduction of vehicle bodies and securing collision safety has been increasingly expanded. In particular, recently, the need for ultra-high-strength steel sheets having a tensile strength of 1470 MPa or more is increasing. In addition, a high-strength hot-dip galvanized steel sheet whose surface is hot-dip galvanized is required for a portion requiring rust prevention in a vehicle body.

However, in a case in which an ultra-high-strength steel sheet having a tensile strength exceeding 1470 MPa is applied as a member for automobiles, it is necessary to solve hydrogen embrittlement cracking of the steel sheet while achieving press formability.

Hydrogen embrittlement cracking is a phenomenon in which a steel member on which a high stress acts under use conditions is suddenly broken due to hydrogen entering the steel from the environment. This phenomenon is also called delayed fracture from the occurrence mode of fracture. In general, it is known that hydrogen embrittlement cracking of a steel sheet is more likely to occur as the tensile strength of the steel sheet increases. It is considered that this is because the higher the tensile strength of the steel sheet, the larger the stress remaining in the steel sheet after part forming. The sensitivity to hydrogen embrittlement cracking (delayed fracture) is referred to as hydrogen embrittlement resistance.

Various attempts have been made so far to improve hydrogen embrittlement resistance of a steel sheet.

For example, Patent Document 1 discloses "an ultra-high strength cold rolled steel sheet having a predetermined chemical composition, in which values of a solid solution B amount solB [mass %] and a prior austenite grain size Dγ [μm] in the steel satisfy a relationship of Formula (1): solB Dγ≥0.0010, further the steel sheet has a steel structure in which, in terms of area ratio, polygonal ferrite is 10% or less, bainite is 30% or less, retained austenite is 6% or less, and tempered martensite is 60% or more, the number density of Fe carbides in the tempered martensite is $1 \times 10^6$/mm² or more, the average dislocation density of the entire steel is $1.0 \times 10^{15}$/m² or more and $2.0 \times 10^{16}$/m² or less, and the effective crystal grain size is 7.0 μm or less, and the steel sheet has a tensile strength of 1300 MPa or more and excellent hydrogen embrittlement resistance."

In addition, Patent Document 2 discloses "a cold-rolled steel sheet having a predetermined component composition, a structure in which tempered martensite and bainite are contained in a total area ratio of 95% or more and 100% or less with respect to a whole volume of the structure, a number of inclusion groups having a total length in a rolling direction of more than 120 μm is at most 0.8/mm2, the inclusion groups being formed by one or more inclusion particles, the one or more inclusion particles having a major axis length of 0.3 μm or more and extending and/or distributed in a dot-sequence manner along the rolling direction, and in the case of an inclusion group being formed by two or more inclusion particles, the two or more inclusion particles are spaced apart from one another by 30 μm or less, a number of carbides mainly including Fe that have an aspect ratio of 2.5 or less and a major axis length of 0.20 μm or more and 2 μm or less is at most 3,500/mm², a number of carbides that are distributed in the tempered martensite and/or in the bainite and that have a diameter of 10 nm to 50 nm is $0.7 \times 10^7$/mm² or more, and prior γ grains have a mean grain size of 18 μm or less; a sheet thickness of 0.5 to 2.6 mm; and a tensile strength of 1320 MPa or more."

In addition, Patent Document 3 discloses "an ultra-high-strength steel sheet having a predetermined component composition, a structure including martensite: 90% or more and retained austenite: 0.5% or more in terms of area ratio with respect to the total structure, in which a region where a local Mn concentration is 1.1 times or more the Mn content of the entire steel sheet is present in an area ratio of 2% or more, and a tensile strength of 1470 MPa or more, the ultra-high-strength steel sheet having excellent delayed fracture resistance at a cut end."

PRIOR ART DOCUMENT

Patent Documents

Patent Document 1: Japanese Patent Application Laid-Open (JP-A) No. 2016-50343

Patent Document 2: WO 2016/152163

Patent Document 3: Japanese Patent Application Laid-Open (JP-A) No. 2016-153524

SUMMARY OF INVENTION

Technical Problem

As described above, any of Patent Documents 1 to 3 discloses a steel sheet having excellent hydrogen embrittlement resistance.

However, in recent years when the required level is high, the steel sheet is currently required to have further improved hydrogen embrittlement resistance, particularly to have improved hydrogen embrittlement resistance of a sheared portion while having a tensile strength of 1470 MPa or more and high total elongation.

Therefore, an object of the disclosure is to provide a steel sheet having excellent hydrogen embrittlement resistance of a sheared portion while having a tensile strength of 1470 MPa or more and high total elongation.

Solution to Problem

As solution to the problem, the following aspects are included:

[1] A steel sheet having a chemical composition that contains, in mass %:
C: 0.18% to 0.35%,
Si: 0.01% to 1.00%,
Mn: 0.10% to 2.40%,
P: 0.050% or less,
S: 0.0050% or less,
Al: 0.001% to 1.00%,
Ti: 0.001% to 0.050%,
B: 0.0005% to 0.0050%,
N: 0.0100% or less,
O: 0.0050% or less,
Cr: 0% to 1.00%,
Mo: 0% to 0.50%,
Cu: 0% to 0.50%,
Ni: 0% to 0.50%, Co: 0% to 0.50%,
W: 0% to 0.50%,
Sn: 0% to 0.50%,
Sb: 0% to 0.50%,
Nb: 0% to 0.050%,
V: 0% to 0.50%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%,
REM: 0% to 0.0100%, and
a balance consisting of Fe and impurities, and
that satisfies the Formula: $0.001 \leq Ti-(47.88/14.01) \times N \leq 0.040$, wherein each element symbol represents mass % of the corresponding element; and
a steel structure in a cross section in a rolling direction of a steel sheet and in a range of from ⅛ thickness to ⅜ thickness centered on ¼ thickness from a surface of the steel sheet,
that contains, in area ratio %,
ferrite: 0 to 5%,
martensite: 90.0 to 99.5%,
a ratio of tempered martensite to total martensite: 80.0 to 100.0%, and
retained austenite: 0.5 to 6.0%,
and
in a measurement region defined by a range of from ⅛ thickness to ⅞ thickness from the surface of the steel sheet×25 mm in the cross section in the rolling direction of the steel sheet, a number density of inclusions satisfying a maximum diameter≥3 μm is 40 inclusions/mm² or less,
when the measurement region is divided into 100 sections obtained by dividing the measurement region into 2 sections in a thickness direction and 50 sections in a width direction, and the number density of the inclusions satisfying the maximum diameter≥3 μm in each section is calculated, the number density in a section where the number density of inclusions is in a top 10% is 80 inclusions/mm² or less,
the following Formula (A) is satisfied, and
a tensile strength is 1470 MPa or more.

$$V\gamma'/V\gamma \geq 0.1 \tag{A}$$

wherein Vγ: area ratio of initial retained austenite, Vγ': area ratio of retained austenite after deep cooling at −196° C.

[2]

The steel sheet according to [1], in which the number density of inclusions satisfying the maximum diameter≥3 μm is 30 inclusions/mm² or less.

[3]

The steel sheet according to [1] or [2], in which the number density in the section where the number density of inclusions is in the top 10% is 60 inclusions/mm² or less.

[4]

The steel sheet according to any one of [1] to [3], satisfying the following Formula (A2):

$$V\gamma'/V\gamma \geq 0.2 \tag{A2}$$

wherein Vγ: area ratio of initial retained austenite, Vγ': area ratio of retained austenite after deep cooling at −196° C.

Advantageous Effects of Invention

According to the disclosure, it is possible to provide a steel sheet having excellent hydrogen embrittlement resistance of a sheared portion while having a tensile strength of 1470 MPa or more and high total elongation.

DESCRIPTION OF EMBODIMENTS

Figure 1:
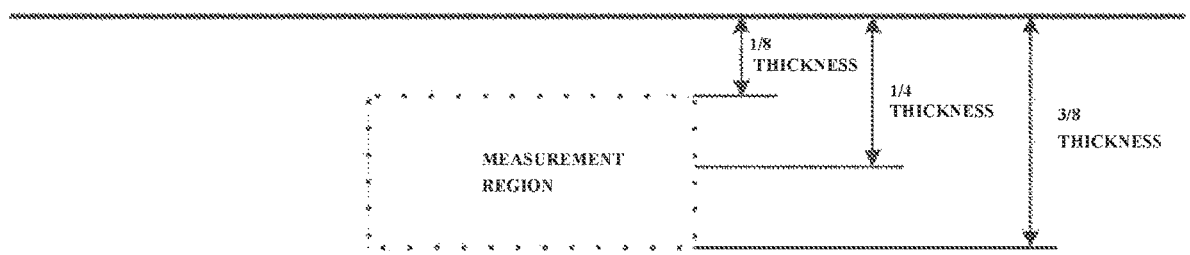
FIG. 1 is a schematic view for explaining measurement positions of area ratios of structures in a steel structure.

Hereinafter, the disclosure will be described.

In the present specification, any numerical range represented by "to" means a range including numerical values described before and after "to" as a lower limit value and an upper limit value, respectively.

In a numerical range described in stages, an upper limit value described in a certain numerical range may be replaced with an upper limit value in another numerical range described in stages, and a lower limit value may be replaced with a lower limit value in another numerical range described in stages.

In a numerical range, an upper limit value or a lower limit value described in a certain numerical range may be replaced with a value shown in Examples.

The term "step" includes not only an independent step but also a step that cannot be clearly distinguished from other steps as long as the intended purpose of the step is achieved.

A "combination of preferred embodiments" is a more preferred embodiment.

The "cross section in the rolling direction of the steel sheet" indicates a cut surface in which the sheet width direction of the steel sheet is a normal line.

The notation "Y/X thickness" indicates Y/X of the sheet thickness. Specifically, "⅛ thickness" indicates ⅛ of the sheet thickness.

(Steel Sheet)

The steel sheet of the disclosure has a predetermined chemical composition and has the following steel structure:

(1) The steel structure in a range of from ⅛ thickness to ⅜ thickness centered on ¼ thickness from the surface of the steel sheet contains, in area ratio %, ferrite: 0 to 5%, martensite: 90.0 to 99.5%, a ratio of tempered martensite to total martensite: 80.0 to 100.0%, and retained austenite: 0.5 to 6.0%.

(2) In a measurement region defined by a range of from ⅛ thickness to ⅞ thickness from the surface of the steel sheet×25 mm in the cross section in the rolling direction of the steel sheet, a number density of inclusions satisfying a maximum diameter≥3 μm is 40 inclusions/mm² or less.

(3) When the measurement region for the number density of inclusions is divided into 100 sections obtained by dividing the measurement region into 2 sections in the thickness direction and 50 sections in the width direction, and the number density of the inclusions satisfying the maximum diameter≥3 μm in each section is calculated, the number density in the section where the number density of inclusions is in the top 10% is 80 inclusions/mm² or less.

(4) Formula (A) is satisfied.

$$V\gamma'/V\gamma \geq 0.1 \tag{A}$$

wherein $V\gamma$: initial retained austenite, $V\gamma'$: retained austenite after deep cooling at −196° C.

(5) The tensile strength is 1470 MPa or more.

With the above configuration, the steel sheet of the disclosure is a steel sheet excellent in hydrogen embrittlement resistance of a sheared portion while having a tensile strength of 1470 MPa or more and high total elongation. The steel sheet of the disclosure has been found by the following findings.

The inventor has studied hydrogen embrittlement resistance of the sheared portion. As a result, the following findings were obtained.

In a high-strength steel sheet, a minute initial crack may occur immediately below the end surface of the sheared portion. In the sheared portion, such an initial crack immediately below the end face becomes a starting point of hydrogen embrittlement cracking. Furthermore, this initial crack tends to occur at a site where a large number of coarse inclusions are accumulated. That is, it is known that hydrogen embrittlement resistance is improved when the number density of inclusions is reduced, but hydrogen embrittlement resistance of the sheared portion can be further improved by reducing the degree of accumulation of inclusions (that is, the number density in the section where the number density of inclusions is in the top 10%).

Retained austenite also causes hydrogen embrittlement cracking resistance of the sheared portion. This is because the retained austenite undergoes stress-induced transformation into martensite by shearing. Such martensite is extremely brittle because it contains a high concentration of solid solution carbon, and is considered to adversely affect hydrogen embrittlement cracking. On the other hand, retained austenite is also a structure necessary for increasing ductility of the steel sheet.

Therefore, the inventor has studied stabilization of the retained austenite. As a result, it has been revealed that stability of the retained austenite can be enhanced by devising a cooling pattern in a continuous annealing step, and as a result, hydrogen embrittlement resistance of the sheared portion can be improved.

That is, the inventor has found that the steel structure can improve hydrogen embrittlement resistance of the sheared portion while having a tensile strength of 1470 MPa or more and high total elongation.

From the above findings, it has been found that the steel sheet of the disclosure has excellent hydrogen embrittlement resistance of the sheared portion while having a tensile strength of 1470 MPa or more and high total elongation.

Hereinafter, the steel sheet of the disclosure will be described in more detail.

(Chemical Composition)

The chemical composition of the steel sheet according to the disclosure will be described.

Cr, Mo, Cu, Ni, Co, W, Sn, Sb, Nb, V, Ca, Mg, Ce, Zr, La, Hf, Bi, and REM are optional elements, and need not be contained in the steel.

[C: 0.18% to 0.35%]

C is an essential element for achieving a desired tensile strength. On the other hand, an excessive C content deteriorates hydrogen embrittlement resistance and weldability. Therefore, the amount of C is set to 0.18% to 0.35%.

The lower limit of the amount of C is preferably 0.19% or more, and more preferably 0.20% or more.

The upper limit of the amount of C is preferably 0.33% or less, and more preferably 0.25% or less.

[Si: 0.01% to 1.00%]

In addition to being a solid solution strengthening element, Si is an element effective for increasing the strength of the steel sheet in order to suppress the generation and growth of iron carbide in martensite. On the other hand, an excessive Si content deteriorates chemical convertibility and hydrogen embrittlement resistance of the steel sheet. Therefore, the amount of Si is set to 0.01% to 1.00%.

The lower limit of the amount of Si is preferably 0.10% or more, and more preferably 0.30% or more.

The upper limit of the amount of Si is preferably 0.90% or less, and more preferably 0.80% or less.

[Mn: 0.10% to 2.40%]

Mn is a strong austenite stabilizing element and is an essential element for improving the hardenability of the steel sheet. On the other hand, an excessive Mn content deteriorates the toughness and hydrogen embrittlement resistance of spot welds. Therefore, the amount of Mn is set to 0.10% to 2.40%.

The lower limit of the amount of Mn is preferably 0.70% or more, more preferably 1.00% or more, and still more preferably 1.30% or more.

The upper limit of the amount of Mn is preferably 2.10% or less, and more preferably 1.80% or less.

[P: 0.050% or Less]

P is a solid solution strengthening element, and is an element effective for increasing the strength of the steel sheet. On the other hand, an excessive P content deteriorates weldability and toughness. Therefore, the amount of P is 0.050% or less.

The upper limit of the amount of P is preferably 0.02% or less, and more preferably 0.015%.

However, from the viewpoint of suppressing an increase in P removal cost, the lower limit of the amount of P is, for example, more than 0% (preferably 0.001%).

[S: 0.0050% or Less]

S is an element contained as an impurity, and forms MnS in the steel to deteriorate toughness, hole expandability, and hydrogen embrittlement resistance. Therefore, the amount of S is 0.0050% or less.

The upper limit of the amount of S is preferably 0.0040% or less, and more preferably 0.0030% or less.

However, from the viewpoint of suppressing an increase in S removal cost, the lower limit of the amount of S is, for example, more than 0% (preferably 0.0001%).

[Al: 0.001% to 1.00%]

Al is an element for deoxidation of steel. On the other hand, when Al is excessively contained, not only the deoxidation effect is saturated, leading to a cost increase, but also the transformation temperature of the steel is increased, resulting in increase of load during hot rolling. Therefore, the amount of Al is set to 0.001% to 1.00%.

The lower limit of the amount of Al is preferably 0.005% or more, and more preferably 0.010% or more.

The upper limit of the amount of Al is preferably 0.50% or less, and more preferably 0.20% or less.

[Ti: 0.001% to 0.050%]

Ti suppresses the formation of BN, which is a factor for decreasing hardenability, by fixing N as TiN in the steel. In addition, the austenite grain size during heating is refined to improve toughness and hydrogen brittleness resistance. On the other hand, when Ti is excessively contained, a large amount of coarse TiS is generated, and the toughness and hydrogen brittleness resistance of the steel sheet are reduced. Therefore, the amount of Ti is set to 0.001% to 0.050%.

The lower limit of the amount of Ti is preferably 0.005% or more, and more preferably 0.010% or more.

The upper limit of the amount of Ti is preferably 0.040% or less, and more preferably 0.030% or less.

[B: 0.0005% to 0.0050%]

B segregates at austenite grain boundaries during heating of the steel sheet and stabilizes the austenite grain boundaries, thereby enhancing the hardenability of the steel. In addition, the toughness and hydrogen embrittlement resistance of the steel sheet are improved by increasing the bonding force of the austenite grain boundary. On the other hand, an excessive B content results in impairment of the hardenability of the steel by forming boride. Therefore, the amount of B is set to 0.0005% to 0.0050%.

The lower limit of the amount of B is preferably 0.0007% or more, and more preferably 0.0010% or more.

The upper limit of the amount of B is preferably 0.0035% or less, and more preferably 0.0025% or less.

[N: 0.0100% or Less]

N is an element contained as an impurity, and forms a coarse nitride in the steel to deteriorate hole expandability and hydrogen embrittlement resistance. Therefore, the amount of N is 0.0100% or less.

The upper limit of the amount of N is preferably 0.0060% or less.

However, from the viewpoint of suppressing an increase in N removal cost, the lower limit of the amount of N is, for example, more than 0% (preferably 0.0005%).

[O: 0.0050% or less]

O is an element contained as an impurity, and forms a coarse oxide in the steel to deteriorate hole expandability and hydrogen embrittlement resistance. Therefore, the amount of O is 0.0050% or less.

The upper limit of the amount of O is preferably 0.0030% or less.

However, from the viewpoint of suppressing an increase in O removal cost, the lower limit of the amount of O is, for example, more than 0% (preferably 0.0001%).

The component composition of the steel sheet according to the present embodiment may contain, in addition to the above elements, one or two or more selected from the element groups described below for the purpose of improving properties. In the steel sheet according to the present embodiment, these are optional elements. In the steel sheet according to the present embodiment, the content of these optional elements may be less than the lower limit value (including 0%) shown below for each of these optional elements.

[Cr: 0% to 1.00%]

Cr is an element effective for increasing the strength of the steel sheet. Therefore, Cr may be contained in the steel as necessary. On the other hand, an excessive Cr content saturates the effect, leading to an increase in cost. Therefore, the amount of Cr is set to 0% to 1.00%.

The lower limit of the amount of Cr is preferably 0.001% or more.

The upper limit of the amount of Cr is preferably 0.50% or less.

[Mo: 0% to 0.50%]

Mo is an element effective for improving hardenability of the steel sheet, and also has an effect of improving toughness and hydrogen embrittlement resistance by refining the austenite grain size during heating of the steel sheet. Therefore, Mo may be contained in the steel as necessary. On the other hand, an excessive Mo content saturates the effect, leading to an increase in cost. Therefore, the amount of Mo is set to 0% to 0.50%.

The lower limit of the amount of Mo is preferably 0.001% or more, and more preferably 0.050% or more.

The upper limit of the amount of Mo is preferably 0.30% or less, and more preferably 0.20% or less.

[Cu: 0% to 0.50%]

Cu is an element effective for increasing the strength of the steel sheet. Therefore, Cu may be contained in the steel as necessary. On the other hand, an excessive content of Cu saturates the effect, leading to an increase in cost. Therefore, the amount of Cu is set to 0% to 0.50%.

The lower limit of the amount of Cu is preferably 0.001% or more.

The upper limit of the amount of Cu is preferably 0.30% or less.

[Ni: 0% to 0.50%]

Ni is an element effective for increasing the strength of the steel sheet. Therefore, Ni may be contained in the steel as necessary. On the other hand, an excessive Ni content saturates the effect, leading to an increase in cost. Therefore, the amount of Ni is set to 0% to 0.50%.

The lower limit of the amount of Ni is preferably 0.001% or more.

The upper limit of the amount of Ni is preferably 0.30% or less.

[Co: 0% to 0.50%]

Co is an element effective for increasing the strength of the steel sheet. Therefore, Co may be contained in the steel as necessary. On the other hand, an excessive Co content saturates the effect, leading to an increase in cost. Therefore, the amount of Co is set to 0% to 0.50%.

The lower limit of the amount of Co is preferably 0.001% or more.

The upper limit of the amount of Co is preferably 0.30% or less.

[W: 0% to 0.50%]

W is an element effective for increasing the strength of the steel sheet. Therefore, W may be contained in the steel as necessary. On the other hand, an excessive W content saturates the effect, leading to an increase in cost. Therefore, the amount of W is set to 0% to 0.50%.

The lower limit of the amount of W is preferably 0.001% or more.

The upper limit of the amount of W is preferably 0.30% or less.

[Sn: 0% to 0.50%]

Sn is an element effective for improving corrosion resistance of the steel sheet. Therefore, Sn may be contained in the steel as necessary. On the other hand, an excessive Sn content saturates the effect, leading to an increase in cost. Therefore, the amount of Sn is set to 0% to 0.50%.

The lower limit of the amount of Sn is preferably 0.001% or more.

The upper limit of the amount of Sn is preferably 0.30% or less.

[Sb: 0% to 0.50%]

Sb is an element effective for improving corrosion resistance of the steel sheet. Therefore, Sb may be contained in the steel as necessary. On the other hand, an excessive Sb content saturates the effect, leading to an increase in cost. Therefore, the amount of Sb is set to 0% to 0.50%.

The lower limit of the amount of Sb is preferably 0.001% or more.

The upper limit of the amount of Sb is preferably 0.30% or less.

[Nb: 0% to 0.050%]

Nb is a carbide forming element and is an element effective for increasing the strength of the steel sheet.

Therefore, Nb may be contained in the steel as necessary. On the other hand, an excessive Nb content saturates the effect, leading to an increase in cost. Therefore, the amount of Nb is set to 0% to 0.050%.

The lower limit of the amount of Nb is preferably 0.001% or more.

The upper limit of the amount of Nb is preferably 0.035% or less.

[V: 0% to 0.50%]

V is a carbide forming element and is an element effective for increasing the strength of the steel sheet. Therefore, V may be contained in the steel as necessary. On the other hand, an excessive V content saturates the effect, leading to an increase in cost. Therefore, the amount of V is set to 0% to 0.50%.

The lower limit of the amount of V is preferably 0.001% or more.

The upper limit of the amount of V is preferably 0.300% or less.

[Ca: 0% to 0.0100%]

Ca is an element that contributes to fine dispersion of inclusions in the steel, and is an element that contributes to improvement of hydrogen embrittlement resistance and toughness of the steel sheet. Therefore, Ca may be contained in the steel as necessary. On the other hand, an excessive Ca content causes deterioration of ductility. Therefore, the amount of Ca is set to 0% to 0.0100%.

The lower limit of the amount of Ca is preferably 0.0001% or more.

The upper limit of the amount of Ca is preferably 0.0050% or less.

[Mg: 0% to 0.0100%]

Mg is an element that contributes to fine dispersion of inclusions in the steel, and is an element that contributes to improvement of hydrogen embrittlement resistance and toughness of the steel sheet. Therefore, Mg may be contained in the steel as necessary. On the other hand, an excessive Mg content causes deterioration of ductility. Therefore, the amount of Mg is set to 0% to 0.0100%.

The lower limit of the amount of Mg is preferably 0.0001% or more.

The upper limit of the amount of Mg is preferably 0.0050% or less.

[Ce: 0% to 0.0100%]

Ce is an element that contributes to fine dispersion of inclusions in the steel, and is an element that contributes to improvement of hydrogen embrittlement resistance and toughness of the steel sheet. Therefore, Ce may be contained in the steel as necessary. On the other hand, an excessive Ce content causes deterioration of ductility. Therefore, the amount of Ce is set to 0% to 0.0100%.

The lower limit of the amount of Ce is preferably 0.0001% or more.

The upper limit of the amount of Ce is preferably 0.0050% or less.

[Zr: 0% to 0.0100%]

Zr is an element that contributes to fine dispersion of inclusions in the steel, and is an element that contributes to improvement of hydrogen embrittlement resistance and toughness of the steel sheet. Therefore, Zr may be contained in the steel as necessary. On the other hand, an excessive Zr content causes deterioration of ductility. Therefore, the amount of Zr is set to 0% to 0.0100%.

The lower limit of the amount of Zr is preferably 0.0001% or more.

The upper limit of the amount of Zr is preferably 0.0050% or less.

[La: 0% to 0.0100%]

La is an element that contributes to fine dispersion of inclusions in the steel, and is an element that contributes to improvement of hydrogen embrittlement resistance and toughness of the steel sheet. Therefore, La may be contained in the steel as necessary. On the other hand, an excessive La content causes deterioration of ductility. Therefore, the amount of La is set to 0% to 0.0100%.

The lower limit of the amount of La is preferably 0.0001% or more.

The upper limit of the amount of La is preferably 0.0050% or less.

[Hf: 0% to 0.0100%]

Hf is an element that contributes to fine dispersion of inclusions in the steel, and is an element that contributes to improvement of hydrogen embrittlement resistance and toughness of the steel sheet. Therefore, Hf may be contained in the steel as necessary. On the other hand, an excessive Hf content causes deterioration of ductility. Therefore, the amount of Hf is set to 0% to 0.0100%.

The lower limit of the amount of Hf is preferably 0.0001% or more.

The upper limit of the amount of Hf is preferably 0.0050% or less.

[Bi: 0% to 0.0100%]

Bi is an element that reduces microsegregation of a substituted alloy element such as Mn or Si in the steel, and is an element that contributes to improvement of hydrogen embrittlement resistance and toughness of the steel sheet. Therefore, Bi may be contained in the steel as necessary. On the other hand, an excessive Bi content causes deterioration of ductility. Therefore, the amount of Bi is set to 0% to 0.0100%.

The lower limit of the amount of Bi is preferably 0.0001% or more.

The upper limit of the amount of Bi is preferably 0.0050% or less.

[REM: 0% to 0.0100%]

REM is an element that contributes to fine dispersion of inclusions in the steel, and is an element that contributes to improvement of hydrogen embrittlement resistance and toughness of the steel sheet. Therefore, REM may be contained in the steel as necessary. On the other hand, an excessive REM content causes deterioration of ductility. Therefore, the amount of REM is set to 0% to 0.0100%.

The lower limit of the amount of REM is preferably 0.0001% or more.

The upper limit of the amount of REM is preferably 0.0050% or less.

REM stands for Rare Earth Metal, and in the disclosure, refers to elements belonging to the Sc, Y, and lanthanoid series excluding Ce and La.

The amount of REM refers to a total amount of elements belonging to the Sc, Y, and lanthanoid series excluding Ce and La. The elements belonging to the lanthanoid series are contained industrially in the form of misch metal.

[$0.001 \leq Ti-(47.88/14.01) \times N \leq 0.040$, Wherein the Element Symbol Represents Mass of the Corresponding Element.]

The above Formula is a value obtained by subtracting the amount of Ti consumed as TiN from the amount of Ti in the steel. In a case in which the value of the above Formula is too small, a solid solution N that is not fixed as TiN remains, so that boron nitride (BN) is precipitated and hardenability of the steel is reduced. On the other hand, in a case in which the above Formula is too large, the amount of Ti is excessive with respect to the amount of N, and Ti-based inclusions such as sulfides increase.

Therefore, the relationship between the Ti amount and the N amount satisfies $0.001 \leq Ti-(47.88/14.01) \times N \leq 0.040$.

The relationship between the Ti amount and the N amount preferably satisfies $0.003 \leq Ti-(47.88/14.01) \times N \leq 0.025$.

[Balance]

The balance consists of Fe and impurities. The impurities refer to impurities mixed from ores and scraps as raw materials, or from a manufacturing environment or the like, when a steel sheet is industrially manufactured. Examples of the impurities include H, Zn, Pb, Cd, and As. These elements are limited to, for example, 0.01% or less.

(Steel Structure)

Next, the steel structure of the steel sheet according to the disclosure will be described.

[Ferrite: 0 to 5%, Martensite: 90.0 to 99.5%, Ratio of Tempered Martensite to Total Martensite: 80.0 to 100.0%, Retained Austenite: 0.5 to 6.0%]

The steel structure in the range of from ⅛ thickness to ⅜ thickness centered on ¼ thickness from the surface of the steel sheet (see FIG. 1) contains, in area ratio %, ferrite: 0 to 5%, martensite: 90.0 to 99.5%, a ratio of tempered martensite to total martensite: 80.0 to 100.0%, and retained austenite: 0.5 to 6.0%.

When ferrite exceeds 5%, it is difficult to obtain a tensile strength of 1470 MPa or more. In addition, in the structure predominantly containing martensite, when ferrite which is a soft structure is present, the nonuniformity of the structure increases, so that hydrogen embrittlement cracking is promoted. Therefore, the area ratio of ferrite is set to 0 to 5%.

The upper limit of the area ratio of ferrite is preferably 4% or less, preferably 2% or less, and ideally 0%.

By predominantly containing martensite (martensite as quenched+tempered martensite), the steel structure can obtain a tensile strength of 1470 MPa or more. On the other hand, of the martensite, when the amount of martensite as quenched is large and the amount of tempered martensite is small, hydrogen embrittlement resistance is deteriorated.

Therefore, the area ratio of martensite is set to 90.0 to 99.5%, and the ratio of tempered martensite to the total martensite is set to 80.0 to 100.0%.

The lower limit of the area ratio of martensite is preferably 93.0% or more, and more preferably 95.0% or more.

The lower limit of the ratio of tempered martensite to the total martensite is preferably 85.0% or more, and more preferably 90.0% or more.

When retained austenite is included in the steel structure, a work hardening ratio is increased by a TRansformation-Induced Plasticity (TRIP) effect, so that ductility is improved (that is, the total elongation increases). On the other hand, when the amount of retained austenite is excessive, hydrogen embrittlement resistance is deteriorated.

Therefore, the area ratio of retained austenite is set to 0.5 to 6.0%.

The lower limit of the area ratio of retained austenite is preferably 1.0% or more, and more preferably 1.5% or more.

The upper limit of the area ratio of retained austenite is preferably 5.5% or less, and more preferably 5.0% or less.

The steel structure may include a balance structure in addition to ferrite, martensite, and retained austenite. Examples of the balance structure include bainite. The area ratio of the balance structure is from 0 to 10%, for example.

[Method of Measuring Area Ratio of Each Structure]

The area ratios of the structures other than retained austenite are evaluated by SEM-EBSD method (electron backscatter diffraction method) and SEM secondary electron image observation. First, a sample is collected with a sheet-thickness cross section parallel to the rolling direction of the steel sheet as an observation surface, and the observation surface is mechanically polished to be mirror-finished, and then electropolishing is performed. Next, crystal structure and orientation analysis are performed by the SEM-EBSD method for an area of 3000 μm² or more in total in one or a plurality of observation fields in a range of from ⅛ thickness to ⅜ thickness centered on ¼ thickness from the surface in the observation surface. "OIM Analysys 7.0" manufactured by TSL Solutions is used for analysis of data obtained by the EBSD method. The gauge length (step) is set to 0.03 to 0.20 μm. A grain boundary map is obtained using a boundary at which a crystal orientation difference becomes 15 degrees or more, as a grain boundary. Next, the same sample is subjected to nital etching. Thereafter, a secondary electron image is photographed using an FE-SEM in the same field of view as the field of view subjected to crystal orientation analysis by the EBSD. At this time, a mark may be provided in advance with a Vickers indentation or the like. Finally, the grain boundary map and the secondary electron image are superimposed. The structure of each crystal grain surrounded by grain boundaries having an orientation difference of 15 degrees or more is classified based on the following criteria.

In the secondary electron image, a crystal grain in which both a lower structure and an iron-based carbide are not observed and the crystal structure is BCC is determined to be ferrite.

In the secondary electron image, a crystal grain in which a lower structure is observed and an iron-based carbide is precipitated in a single variant or a crystal grain in which an iron-based carbide is not observed is determined to be bainite.

In the secondary electron image, a crystal grain in which cementite is precipitated in a lamellar shape is determined to be pearlite. However, in the disclosure, pearlite is not included in principle.

The balance is determined to be martensite and retained austenite. The area ratio of martensite is obtained by subtracting the area ratio of retained austenite to be described later from the area ratio of the balance.

Among the balance, a crystal grain in which a lower structure is observed and two or more iron-based carbides precipitated in a plurality of variants are observed in the secondary electron image is determined to be tempered martensite.

The area ratio of retained austenite can be calculated by measurement using an X-ray. That is, a portion from the sheet surface of the steel sheet to a position at a depth of ¼ in the sheet thickness direction is removed by mechanical polishing and chemical polishing. Then, the structure fraction of retained austenite is calculated from the integrated intensity ratios between the diffraction peaks of (200) and (211) of a bcc phase and (200), (220), and (311) of a fcc phase obtained using $MoK\alpha_1$ rays as characteristic X-rays for the polished sample, and the result thereof is taken as the area ratio of retained austenite.

[Number Density of Inclusions Satisfying Maximum Diameter≥3 μm]

When a large number of coarse inclusions are present, the inclusions become a starting point of cracking in the sheared portion, and hydrogen embrittlement cracking occurs. Therefore, the number density of coarse inclusions is preferably small.

Figure 2:
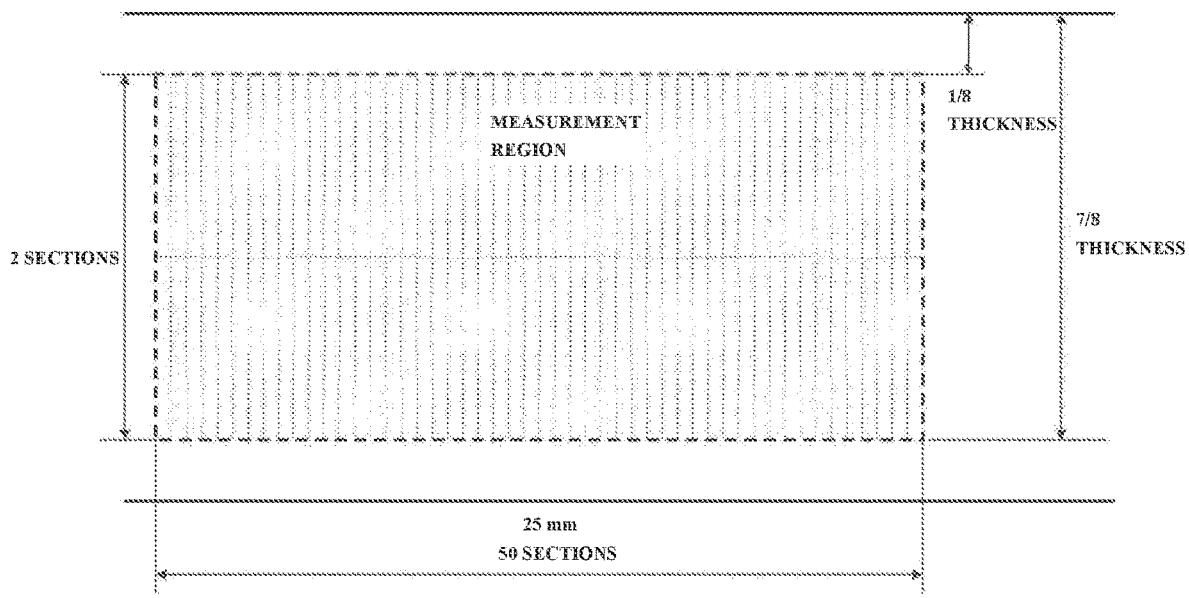
FIG. 2 is a schematic view for explaining measurement positions of the number density of inclusions.

Therefore, in the measurement region (see FIG. 2) defined by a range of from ⅛ thickness to ⅞ thickness from the surface of the steel sheet×25 mm in the cross section in the rolling direction of the steel sheet, the number density of inclusions satisfying the maximum diameter≥3 µm is set to 40 inclusions/mm² or less. Here, the measurement region indicates a region defined as "in the cross section in the rolling direction of the steel sheet, a range of from ⅛ thickness to ⅞ thickness in the sheet thickness direction from the surface of the steel sheet"×"a range of 25 mm in width in the rolling direction of the steel sheet" (see FIG. 2).

The number density of inclusions satisfying the maximum diameter≥3 µm is preferably 30 inclusions/mm² or less, and more preferably 20 inclusions/mm² or less.

Since it is difficult to completely suppress the generation of inclusions, the lower limit of the number density of inclusions satisfying the maximum diameter≥3 µm is, for example, 1 inclusion/mm² or more or 2 inclusion/mm² or more.

Here, the inclusion is, for example, TiS, TiN, TiO, Ti(C, S), MnS, CaS, $Al_2O_3$, $SiO_2$, CaO, or the like, or a composite thereof.

The "maximum diameter" is defined as a diameter in the case of a spherical shape, a length of a major axis in the case of an elliptical shape, a length of a long side in the case of a plate-like shape or a rectangular shape, and a length in the case of a rod shape.

Inclusions having a maximum diameter of less than 3 µm are not considered in the disclosure even if they are accumulated, because they are less likely to develop into minute initial cracks at the end surface of the sheared portion.

[Number Density in Section where Number Density is in Top 10%]

When coarse inclusions are unevenly distributed, coarse inclusions are likely to be present in the sheared portion. These inclusions serve as a starting point of cracking, and hydrogen embrittlement cracking occurs. Therefore, it is preferable to reduce the probability that coarse inclusions are present in the sheared portion by suppressing uneven distribution of coarse inclusions and reducing the degree of accumulation of inclusions.

Therefore, when the measurement region for the number density of inclusions (that is, the measurement region defined by the range of from ⅛ thickness to ⅞ thickness from the surface of the steel sheet×25 mm in the cross section in the rolling direction of the steel sheet) is divided into 100 sections obtained by dividing the measurement region into 2 sections in the thickness direction and 50 sections in the width direction (that is, the rolling direction) (see FIG. 2), and the number density of the inclusions satisfying the maximum diameter≥3 µm in each section is calculated, the number density in the section where the number density of inclusions is in the top 10% is set to 80 inclusions/mm² or less.

The number density in the section where the number density of inclusions is in the top 10% is preferably 60 inclusions/mm² or less, and more preferably 40 inclusions/mm² or less.

Since it is difficult to set the number density of inclusions to 0, the lower limit of the number density in the section where the number density of inclusions is in the top 10% is, for example, 1 inclusion/mm² or more, or 2 inclusions/mm² or more.

[Method of Measuring Number Density of Inclusions]

The method of measuring the number density of inclusions is as follows.

A sample is collected with a sheet-thickness cross section parallel to the rolling direction of the steel sheet as an observation surface, and the observation surface is mechanically polished to be mirror-finished. For a region including a range of from ⅛ thickness to ⅞ thickness from the surface of the steel sheet×25 mm, a reflected electron image of the sample is photographed using an SEM equipped with an EDX (energy dispersive X-ray analyzer), and the composition of each inclusion is measured. Information on the maximum diameter, position, and composition of each inclusion included in the field of view is obtained. An inclusion having a composition that is not considered to be an inclusion, for example, an inclusion in which 5 mass % or more of any of Na, K, and Cl, 15 mass % or more of Si, and 60 mass % or more of O are detected is determined to be contamination caused by tap water, an abrasive, or the like, and is excluded from the measurement result. From the present data, the number density of inclusions is obtained by dividing the number of inclusions having a maximum diameter of 3 µm or more included in the range of from ⅛ thickness to ⅞ thickness×25 mm by the area. Furthermore, as described above, the number density of inclusions in each section is also obtained by measuring the number of inclusions having a maximum diameter of 3 µm or more in each of the 100 divided sections and dividing the number by the section area.

[Formula (A)]

When retained austenite is transformed into martensite (martensite as quenched) by shearing energy, the transformed martensite serves as a starting point in the sheared portion, and hydrogen embrittlement cracking occurs. Therefore, stable retained austenite is preferably present.

Therefore, the following Formula (A) is satisfied as an index that the retained austenite is less likely to be transformed into martensite (martensite as quenched) by shearing. The following Formula (A2) is preferably satisfied, and the following formula (A3) is more preferably satisfied.

However, although the upper limit of "Vγ'/Vγ" is ideally 1, it is difficult to set the upper limit to 1 in practice, and thus, the upper limit thereof is, for example, 0.95 or less, or 0.9 or less.

$$V\gamma'/V\gamma \geq 0.1 \tag{A}$$

$$V\gamma'/V\gamma \geq 0.2 \tag{A2}$$

$$V\gamma'/V\gamma \geq 0.3 \tag{A3}$$

wherein Vγ: area ratio of initial retained austenite, Vγ': area ratio of retained austenite after deep cooling at −196° C.

[Method of Measuring Area Ratios of Initial Retained Austenite and Retained Austenite after Deep Cooling at −196° C.]

The method of measuring the area ratios of initial retained austenite and retained austenite after deep cooling at −196° C. is as follows. First, a sample is cut out from a target steel sheet, and then the steel sheet is subjected to deep cooling with liquid nitrogen at −196° C. The immersion time may be about 1 minute, for example, as long as the immersion is performed until boiling of liquid nitrogen is sufficiently settled. The subsequent sample preparation method and measurement method are the same as the "method of measuring area ratio of retained austenite" described above.

(Mechanical Properties, and Others)

Next, mechanical properties of the steel sheet according to the disclosure will be described.

[Tensile Strength (TS)]

The steel sheet of the disclosure has a tensile strength (TS) of 1470 MPa or more. In order to satisfy the weight reduction and collision safety required for recent automobile steel sheets, the tensile strength of the steel sheet is set to 1470 MPa or more.

[Total Elongation (El)]

The total elongation (El) of the steel sheet according to the disclosure is preferably 6% or more, and more preferably 7% or more.

Here, the tensile strength and total elongation of the steel sheet are measured by a tensile test defined in JIS Z 2241 (2011) at room temperature (25° C.) in the atmosphere.

[Hole Expansion Ratio (λ)]

The hole expansion ratio (λ) of the steel sheet according to the disclosure is preferably 20% or more, and more preferably 30% or more.

The hole expansion ratio (λ) is measured by the "JFS T 1001 hole expansion test method" in accordance with the Japan Iron and Steel Federation Standards.

[Minimum Bending Radius (R)]

The minimum bending radius (R) of the steel sheet according to the disclosure is preferably 5 mm or less, and more preferably 4 mm or less.

The minimum bending radius (R) of a steel sheet is measured by a V block method of a bending test defined in Bend Test: JIS Z 2248 (2014) at room temperature (25° C.) in the atmosphere.

[Plating Layer]

The steel sheet of the disclosure may have a plating layer on both surfaces or one surface. A typical example of the plating layer is a hot-dip galvanized layer.

(Method of Manufacturing Steel Sheet)

Next, an example of a method of manufacturing the steel sheet of the disclosure will be described.

The method of manufacturing the steel sheet of the disclosure is preferably a manufacturing method in which the following steps (1) to (4) are sequentially performed.

[(1) Casting Step]

In the casting step, molten steel having the chemical composition of the steel sheet according to the disclosure is cast in a vertical bending type continuous casting facility having a vertical portion to obtain a steel slab.

Specifically, in the casting step, molten steel is caused to flow into a mold by, for example, a vertical bending type continuous casting facility having a vertical portion, and is cast while being cooled by a primary cooling zone in the mold, by a secondary cooling zone in the vertical portion from an exit side of the mold to a bending start portion, and by a tertiary cooling zone after a bent portion (see FIG. 3), thereby obtaining a steel slab.

Figure 3:
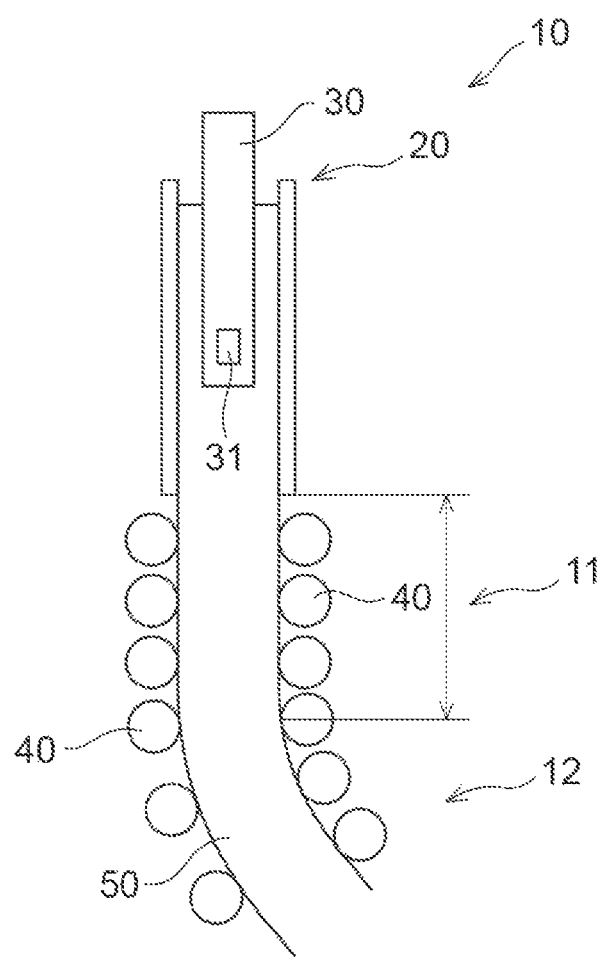
FIG. 3 is a schematic configuration diagram showing a part of a vertical bending type continuous casting facility having a vertical portion.

FIG. 3 is a schematic configuration diagram showing a part of the vertical bending type continuous casting facility having the vertical portion, and in FIG. 3, reference numeral 10 denotes a continuous casting facility, reference numeral 11 denotes a vertical portion from an exit side of a mold to a bending start portion, reference numeral 12 denotes a bent portion, reference numeral 20 denotes a mold (for example, a water-cooled mold), reference numeral 30 denotes an immersion nozzle for supplying molten steel to the mold, reference numeral 31 denotes a discharge port of molten steel of the immersion nozzle, reference numeral 40 denotes a support roll, and reference numeral 50 denotes a steel slab.

From the viewpoint of suppressing the generation and uneven distribution of coarse inclusions and setting the "number density of inclusions" and the "number density of inclusions in the section where the number density is in the top 10%" within the above ranges, the casting step satisfies the following conditions:

—(1-1) Cooling at a cooling rate (also referred to as "vertical portion cooling rate") of 0.5° C./sec or more until the surface temperature of the central portion in the width direction of the steel slab reaches 1000° C. or lower in the secondary cooling zone in which the steel slab is cooled in the vertical portion from the exit side of the mold to the bending start portion—

When the cooling rate is increased in the secondary cooling zone in the vertical portion from the exit side of the mold to the bending start portion, it is difficult for an alloy component (Ti, Mn, S, etc.) that generates inclusions to be concentrated in the steel, and the generation of inclusions and the growth of precipitates are suppressed. Thus, the "number density of inclusions" and the "degree of accumulation of inclusions (that is, the number density in the section where the number density of inclusions is in the top 10%)" can be set within the above ranges.

Therefore, the vertical portion cooling rate is set to 0.5° C./sec or more.

The lower limit of the vertical portion cooling rate is preferably 1.0° C./sec or more.

However, the upper limit of the vertical portion cooling rate is, for example, 10° C./sec or less.

—(1-2) Elapsed Time (Also Referred to as "Vertical Portion Elapsed Time") Until the Steel Slab Reaches the Bending Start Portion from the Exit Side of the Mold being from 50 to 500 Seconds—

When the elapsed time until the steel slab reaches the bending start portion from the exit side of the mold is lengthened, the time for floating and separating the inclusions on the surface of hot water increases, so that the total number of inclusions can be reduced. Thus, it is possible to reduce the degree of accumulation of inclusions (that is, the number density in the section where the number density of inclusions is in the top 10%), together with the number density of inclusions. On the other hand, when the elapsed time is excessively lengthened, productivity is hindered or facility cost is increased.

Therefore, the vertical portion elapsed time is set to 50 to 500 seconds.

The lower limit of the vertical portion elapsed time is preferably 75 seconds or more.

The upper limit of the vertical portion elapsed time is preferably 300 seconds or less.

Here, in the casting step, the secondary cooling zone is cooled by, for example, mist spray.

[(2) Hot Rolling Step]

In the hot rolling step, the steel slab is hot-rolled to obtain a hot-rolled sheet.

Specifically, in the hot rolling step, for example, the steel slab is subjected to rough rolling and finish rolling to obtain a hot-rolled sheet.

From the viewpoint of suppressing the generation of coarse inclusions and setting the "number density of inclusions" and the "degree of accumulation of inclusions (that is, the number density in the section where the number density of inclusions is in the top 10%" within the above ranges, the hot rolling step of the steel slab satisfies the following conditions:

—(2-1) Slab Heating Temperature of 1200° C. or Higher (Preferably from 1220 to 1300° C.)—

By sufficiently heating the steel slab, alloy carbides such as TiC and some inclusions can be sufficiently made into solid solution. Thus, the "number density of inclusions" and the "degree of accumulation of inclusions (that is, the number density in the section where the number density of inclusions is in the top 10%)" can be set within the above ranges.

Therefore, the slab heating temperature is set to 1200° C. or higher.

The lower limit of the slab heating temperature is preferably 1220° C. or higher.

However, the upper limit of the slab heating temperature is, for example, 1300° C. or lower from the viewpoint of suppression of fuel cost, durability of the heating furnace, and the like.

The slab heating temperature is a temperature at the time of slab extraction.

—(2-2) Rolling Ratio at or Below Temperature $T_{TiS\_B1}$ Represented by Formula (B) of 95% or Less—

According to the disclosure, in the casting step, the generation of inclusions and the growth of precipitates are suppressed, and by focusing on the precipitation temperature of TiS among the inclusions, the accumulation of coarse inclusions caused by hydrogen embrittlement cracking is suppressed. The reason is that in a case in which excessive hot rolling is performed after TiS is precipitated, TiS is excessively extended in the rolling direction, so that the maximum diameter of the finally formed inclusion increases. Such an inclusion having a large maximum diameter adversely affects hydrogen embrittlement, and therefore limits the rolling ratio at or below the precipitation temperature of TiS.

The "rolling ratio" at or below the temperature $T_{TiS\_B1}$ means a total rolling ratio at or below the temperature $T_{TiS\_B1}$. The total rolling ratio means the degree of change in sheet thickness associated with rolling, and is a sheet thickness reduction ratio at the end of hot rolling when the sheet thickness at the temperature $T_{TiS\_B1}$ is taken as 100%.

In the hot rolling step, when hot rolling having a high total rolling ratio is performed after TiS is precipitated, the maximum diameter of the inclusion increases because TiS is stretched. That is, when hot rolling is performed by reducing the total rolling ratio after precipitation of TiS, stretching of TiS is suppressed, and coarsening of the inclusion as a whole is suppressed. Thus, the "number density of inclusions" and the "degree of accumulation of inclusions (that is, the number density in the section where the number density of inclusions is in the top 10%)" can be set within the above ranges.

Therefore, the rolling ratio at or below the temperature $T_{TiS\_B1}$ represented by Formula (B1) is 95% or less.

The upper limit of the rolling ratio at or below the temperature $T_{TiS\_B1}$ is preferably 90% or less, and more preferably 85% or less.

The lower limit of the rolling ratio at or below the temperature $T_{TiS\_B1}$ is, for example, 0% or more.

[Mathematical Formula 1]

$$T_{TiSB1} = \frac{-14000}{\log([Ti^*] \cdot [S]) - 6.2} \quad \text{(B1)}$$

$$[Ti^*] = [Ti] - (47.88/14.01) \cdot [N]$$

The temperature $T_{TiS\_B1}$ represented by Formula (B1) is a temperature at which TiS is precipitated. In Formula (B1), the element symbol represents mass % of the corresponding element. The unit of the temperature $T_{TiS\_B1}$ represented by Formula (B1) is Kelvin (K).

As the solubility product of TiS, an empirical formula represented by the following Formula (B) has been reported (see W. J. LIU, ISIJ International, Vol. 30, No. 11, pp. 985-990). However, the following Formula (B) is an empirical formula obtained by an equilibrium experiment using an ultra-low carbon steel sheet. It is assumed that the steel sheet of the disclosure has not reached the equilibrium state because the steel sheet contains a large amount of alloy elements such as carbon, and hot rolling is a relatively short-time phenomenon, so that the precipitation temperature of TiS may be lower than the following Formula (B). Therefore, the inventor has further studied and found that the temperature $T_{TiS\_B1}$ represented by the above Formula (B1) is more suitable for the actual temperature at which TiS is precipitated.

[Mathematical Formula 2]

$$T_{TiS} = \frac{-14559}{\log([Ti^*] \cdot [S]) - 6.24} \quad \text{(B)}$$

$$[Ti^*] = [Ti] - (48/14) \cdot [N]$$

In Formula (B), the element symbol represents mass % of the corresponding element. The unit of the temperature $T_{TiS}$ represented by Formula (B) is also Kelvin (K).

The above rolling control exhibits a more excellent effect in a case in which the casting conditions of the slab satisfy the prescribed range of the disclosure. Although the detailed mechanism is unknown, in a case in which the casting conditions do not satisfy the predetermined range of the disclosure, the segregation degrees of Ti and S in the slab may be increased. As a result, since the concentrations of Ti and S are high in the segregated portion, precipitation of TiS may occur at a temperature higher than $T_{TiS}$.

Here, in the hot rolling step, for example, finish rolling is performed at a finish rolling temperature of 800 to 1100° C. The hot-rolled sheet after hot rolling is wound up at a winding temperature of 400 to 700° C., for example.

The slab heating temperature, the finish rolling temperature, and the winding temperature are surface temperatures of the central portion in the width direction of the steel slab or sheet.

[(3) Pickling and Cold Rolling Step]

The hot-rolled sheet may be pickled, then cold-rolled to obtain a cold-rolled sheet, and then a continuous annealing step to be described later may be performed. The conditions for pickling and cold rolling may be general conditions. The cold rolling step is an optional step.

[(4) Continuous Annealing Step]

In the continuous annealing step, the hot-rolled sheet or the cold-rolled sheet is subjected to continuous annealing.

Specifically, in the continuous annealing step, the hot-rolled sheet or the cold-rolled sheet is heated, held at a maximum heating temperature for a predetermined time (heating step), and then subjected to primary cooling, secondary cooling, and low-temperature holding to obtain an annealed sheet.

From the viewpoint of obtaining the intended steel structure, stabilizing the retained austenite, and satisfying Formula (A), a continuous annealing step satisfying the following conditions is adopted.

—(4-1) Maximum Heating Temperature of $Ac_3$ to 950° C. and Holding Time at the Maximum Heating Temperature of Less than 240 Seconds—

In the heating step, in order to obtain an intended steel structure, the hot-rolled sheet or the cold-rolled sheet is sufficiently heated and austenitized. However, when the holding time at the maximum heating temperature is long, the crystal grain size becomes coarse, and in addition, fuel cost increases and facilities are damaged.

Therefore, the maximum heating temperature is set to $Ac_3$ to 950° C., and the holding time at the maximum heating temperature is less than 240 seconds.

The lower limit of the maximum heating temperature is preferably $Ac_3+10°$ C. or higher. The upper limit of the maximum heating temperature is preferably 920° C. or lower.

The upper limit of the holding time at the maximum heating temperature is preferably 200 seconds or less. However, from the viewpoint of sufficiently austenitizing, the lower limit of the holding time at the maximum heating temperature is, for example, 50 seconds or more.

"Holding" at a predetermined temperature in the heating step is not necessarily required to hold the steel sheet at a constant temperature, and may vary within a range satisfying the above conditions.

$Ac_3$ (° C.) can be obtained by the following formula.

$$Ac_3=912-230.5C+31.6Si-20.4Mn-39.8Cu-18.1Ni-14.8Cr+16.8Mo+100Al$$

However, each element symbol in the formula represents mass % of the corresponding element. In a case in which the content is 0, the temperature is calculated by substituting 0 into the formula.

Here, the heating step is preferably performed, for example, under an atmosphere having a dew point of −50 to +10° C. and a hydrogen concentration of 1 to 5 vol %.

—(4-2) Average Cooling Rate at Temperatures Between 400 and 700° C. in the Primary Cooling Step of Cooling from the Maximum Heating Temperature to 400° C. or Lower, of 30° C./Sec or More.—

In the primary cooling step, when the hot-rolled sheet or the cold-rolled sheet (referred to as a heat-treated sheet) heat-treated from the maximum heating temperature to 400° C. or lower is cooled and the heat-treated sheet is rapidly cooled at temperatures between 400 and 700° C., generation of a steel structure other than martensite can be suppressed.

Therefore, the average cooling rate at temperatures between 400 and 700° C. is set to 30° C./sec or more.

The lower limit of the average cooling rate is preferably 40° C./sec.

However, it is difficult to set the cooling rate to 200° C./sec or more due to cooling facility capacity.

The upper limit of the primary cooling stop temperature is preferably 380° C. or lower.

However, the lower limit of the primary cooling stop temperature is desirably equal to or higher than Ms−60° C. at which a certain amount of untransformed austenite remains in order to distribute C to austenite.

—(4-3) Average Cooling Rate During a Period from Stop of the Primary Cooling to Stop of the Secondary Cooling in the Secondary Cooling Step of Cooling to a Range of from 100° C. to Ms−120° C. after the Stop of the Primary Cooling, of from 1 to 20° C./Sec—

In the secondary cooling step, after the primary cooling is stopped, the heat-treated sheet is cooled to the range of from 100° C. to Ms−120° C., and the cooling rate of the heat-treated sheet is decreased during a period from stop of the primary cooling to stop of the secondary cooling, whereby C, Mn, and the like can be concentrated into untransformed austenite, which allows more stable retained austenite to be present. That is, after the primary cooling is stopped, the average cooling rate is set to 1 to 20° C./sec, and the cooling attainment temperature is set to 100° C. to Ms−120° C., so that the area ratio of retained austenite falls within the above range and Formula (A) is satisfied. When the cooling rate of the heat-treated sheet is less than 1° C./sec, the area ratio of martensite decreases. It is not preferable that the cooling rate of the heat-treated sheet is more than 20° C./sec because stable retained austenite cannot be present.

Therefore, the average cooling rate during the period from stop of the primary cooling to stop of the secondary cooling is set to 1 to 20° C./sec.

The lower limit of the average cooling rate is preferably 5° C./sec or more.

The upper limit of the average cooling rate is preferably 18° C./sec or less.

Ms (° C.) can be obtained by the following formula.

$$Ms=561-474C-33Mn-17Cr-21Mo-7.5Si+10Co$$

However, each element symbol in the formula represents mass % of the corresponding element. In a case in which the content is 0, the temperature is calculated by substituting 0 into the formula.

Each temperature in the continuous annealing step is the surface temperature of the central portion in the width direction of the hot-rolled sheet or the cold-rolled sheet. The average cooling rate is calculated based on the surface temperature of the central portion in the width direction of the cold-rolled sheet.

—(4-4) Holding Time of 150 Seconds or More in a Low-Temperature Holding Step of Holding in a Range of from 200 to 320° C. after the Secondary Cooling—

After cooling to the cooling attainment temperature, the heat-treated sheet is held in the range of 200 to 320° C. In the low-temperature holding step, after start of martensite formation, the heat-treated sheet is held in the range of from 200 to 320° C., and therefore, C, Mn, and the like are concentrated into untransformed austenite, and retained austenite is stabilized. That is, Formula (A) is satisfied. In addition, the martensite as quenched is tempered, and the ratio of the tempered martensite to the total martensite increases. That is, the ratio of the tempered martensite to the total martensite satisfies the above range.

Therefore, the holding time is set to 150 seconds or more.

The lower limit of the holding time is preferably 200 seconds or more.

However, from the viewpoint of productivity, the upper limit of the holding time is, for example, 1000 seconds or less.

"Holding" in the low-temperature holding step means that the temperature is maintained within a range of a predetermined temperature±20° C., preferably ±10° C. without exceeding upper and lower limit values of the holding temperature. Therefore, the low-temperature holding step in the disclosure does not include a heating operation and a cooling operation that fluctuate more than 40° C. within the temperature range defined in the low-temperature holding step by gradually cooling or gradually heating.

Here, when the holding temperature in the low-temperature holding step is higher than 320° C., tempering of martensite excessively proceeds, so that the strength is reduced. On the other hand, when the holding temperature in the low-temperature holding step is lower than 200° C., carbon is less likely to be distributed from martensite to austenite, so that retained austenite is less likely to be stabilized. Therefore, the holding temperature in the low-temperature holding step is set to 200 to 320° C.

In a case in which the low-temperature holding step is not performed, the retained austenite is not stabilized and Formula (A) is not satisfied.

[Other Steps]

A steel sheet obtained by the method of manufacturing the steel sheet of the disclosure may be subjected to a subsequent step such as a plating step of forming a plating layer on one surface or both surfaces of the steel sheet. A subsequent step such as a plating step can be performed by an ordinary method.

EXAMPLES

Hereinafter, examples of the steel sheet according to the disclosure will be described.

A 240 mm-thick steel slab was cast from molten steel having the chemical composition shown in Table 1 by a vertical bending type continuous casting facility having a vertical portion under conditions shown in Table 2.

Next, under the conditions shown in Table 2, the steel slab was hot-rolled to obtain a hot-rolled sheet having a thickness of 3.0 mm, and the hot-rolled sheet was wound up.

Next, after pickling the hot-rolled sheet, the hot-rolled sheet was cold-rolled under the conditions shown in Table 2 to obtain a cold-rolled sheet. A cold rolling ratio of 0% indicates that cold rolling has not been performed.

Next, the cold-rolled sheet was continuously annealed under the conditions shown in Table 2 to obtain an intended steel sheet. However, in Table 2, values in the "$T_{TiSB1}$" column are expressed in degrees Celsius (° C.). That is, in order to express the temperature in degrees Celsius (° C.), a value obtained by subtracting 273.15 from the value (unit: K) calculated by Formula (B1) is described.

In the "Surface" column of Table 3, an example denoted as "CR" indicates an example in which a steel sheet is obtained without plating after cold rolling, and an example denoted as "EG" indicates an example in which a plated steel sheet is obtained by electrogalvanizing after cold rolling.

For the obtained steel sheet, the following properties were measured according to the method described above.

Steel structure in the cross section in the rolling direction of the steel sheet and in a range of from ⅛ thickness to ⅜ thickness centered on ¼ thickness from the surface of the steel sheet (ferrite, martensite, ratio of tempered martensite to total martensite (denoted as "tempered ratio" in the table), retained austenite (denoted as "retained γ" in the table), and bainite)
  Number density of inclusions satisfying the maximum diameter≥3 μm (denoted as "average" of the number density of inclusions in the table) in a measurement region defined by the range of from ⅛ thickness to ⅞ thickness from the surface of the steel sheet×25 mm in the cross section in the rolling direction of the steel sheet
  When the measurement region for the number density of inclusions is divided into 100 sections obtained by dividing the measurement region into 2 sections in the thickness direction and 50 sections in the width direction, and the number density of the inclusions satisfying the maximum diameter≥3 μm in each section is calculated, the number density in the section where the number density of inclusions is in the top 10% (denoted as "top 10% section" with the number density of inclusions in the table)
  Value of Vγ'/Vγ (area ratio of retained austenite after deep cooling at −196° C./area ratio of initial retained austenite) (denoted as "−" when Vγ'/Vγ could not be calculated due to a small amount of Vγ')
  Tensile strength of steel sheet (denoted as "TS" in the table)
  Total elongation of steel sheet (denoted as "El" in the table)
  Hole expansion ratio of steel sheet (denoted as "λ" in the table)
  Minimum bending radius of steel sheet (denoted as "R" in the table)

(Evaluation)

Hydrogen embrittlement resistance of the obtained steel sheet was evaluated under the following conditions.

A 40 mm square test piece was taken from the steel sheet, and a punched hole was formed in the vicinity of the center of the test piece using a punch having a diameter of 20 mm and a die having a diameter of 20.5 mm. Thereafter, the test piece was immersed in aqueous hydrochloric acid solutions having hydrochloric acid concentrations of 0.01N, 0.1N, and 1N for 48 hours. The liquid amount was 500 mL per test piece. The aqueous hydrochloric acid solution was replaced with a new aqueous solution after a lapse of 8 hours and 24 hours. After a lapse of 48 hours, the test piece was sufficiently washed and dried, and then the entire circumference of the end surface of the punched hole was observed using a microscope to confirm the presence or absence of cracks. The number n was 3, and one of them in which a crack was observed was judged as NG (unacceptable). For example, the test piece in which none of the three test pieces was cracked at 0.01N was regarded as acceptable (OK), and the test piece in which one or more test piece was cracked at 0.01N was regarded as unacceptable (NG).

A case where hydrogen embrittlement cracking did not occur was marked as "OK", and a case where hydrogen embrittlement cracking occurred was marked as "NG".

TABLE 1

| | Chemical composition (mass %) Balance: Iron and impurities | | | | | | | | | | | | |
|---|---|---|---|---|---|---|---|---|---|---|---|---|---|
| | C | Si | Mn | P | S | Al | Ti | B | N | O | Ti* | Cr | Mo | Cu |
| A | 0.22 | 0.53 | 1.30 | 0.009 | 0.0012 | 0.04 | 0.020 | 0.0017 | 0.0029 | 0.0013 | 0.010 | 0.20 | 0.08 | 0.06 |
| B | 0.23 | 0.50 | 1.78 | 0.006 | 0.0010 | 0.01 | 0.019 | 0.0009 | 0.0033 | 0.0011 | 0.008 | | | |
| C | 0.20 | 0.95 | 1.97 | 0.010 | 0.0022 | 0.07 | 0.018 | 0.0031 | 0.0020 | 0.0007 | | | | |
| D | 0.23 | 0.61 | 1.45 | 0.010 | 0.0013 | 0.03 | 0.021 | 0.0011 | 0.0030 | 0.0015 | 0.011 | | | 0.15 |
| E | 0.21 | 0.14 | 1.17 | 0.011 | 0.0006 | 0.08 | 0.029 | 0.0012 | 0.0028 | 0.0017 | 0.019 | 0.13 | 0.05 | 0.20 |
| F | 0.24 | 0.26 | 0.66 | 0.012 | 0.0011 | 0.05 | 0.035 | 0.0027 | 0.0049 | 0.0019 | 0.018 | 0.90 | | |
| G | 0.21 | 0.82 | 1.62 | 0.006 | 0.0014 | 0.40 | 0.019 | 0.0014 | 0.0034 | 0.0007 | 0.007 | | | |
| H | 0.19 | 0.75 | 1.58 | 0.008 | 0.0022 | 0.09 | 0.020 | 0.0020 | 0.0030 | 0.0013 | 0.010 | | | |
| I | 0.25 | 0.07 | 0.98 | 0.015 | 0.0013 | 0.01 | 0.031 | 0.0018 | 0.0025 | 0.0010 | 0.022 | | 0.40 | 0.12 |
| J | 0.28 | 0.30 | 1.48 | 0.011 | 0.0028 | 0.06 | 0.022 | 0.0013 | 0.0040 | 0.0015 | 0.008 | | 0.15 | 0.41 |
| K | 0.33 | 0.48 | 1.52 | 0.007 | 0.0009 | 0.03 | 0.025 | 0.0010 | 0.0046 | 0.0007 | 0.009 | | 0.10 | 0.18 |
| L | 0.21 | 0.51 | 2.35 | 0.008 | 0.0022 | 0.02 | 0.018 | 0.0021 | 0.0030 | 0.0018 | 0.008 | | | |
| M | 0.20 | 0.64 | 2.60 | 0.009 | 0.0017 | 0.02 | 0.016 | 0.0015 | 0.0029 | 0.0012 | 0.006 | | | |

TABLE 1-continued

| | | | | | | | | | | | | | |
|---|---|---|---|---|---|---|---|---|---|---|---|---|---|
| N | 0.20 | 1.20 | 1.73 | 0.013 | 0.0012 | 0.11 | 0.037 | 0.0013 | 0.0023 | 0.0013 | 0.029 | | 0.06 |
| O | 0.38 | 0.34 | 1.09 | 0.008 | 0.0014 | 0.03 | 0.024 | 0.0008 | 0.0033 | 0.0005 | 0.013 | | |
| P | 0.22 | 0.68 | 1.55 | 0.010 | 0.0006 | 0.08 | 0.015 | 0.0002 | 0.0028 | 0.0013 | 0.005 | | |
| Q | 0.23 | 0.49 | 1.33 | 0.010 | 0.0011 | 0.08 | 0.020 | 0.0060 | 0.0015 | 0.0009 | 0.015 | | |
| R | 0.16 | 0.40 | 1.70 | 0.009 | 0.0018 | 0.09 | 0.022 | 0.0019 | 0.0042 | 0.0018 | 0.008 | 0.17 | |
| S | 0.22 | 0.53 | 1.64 | 0.011 | 0.0008 | 0.02 | 0.012 | 0.0016 | 0.0045 | 0.0017 | −0.003 | | |
| T | 0.24 | 0.29 | 1.36 | 0.011 | 0.0010 | 0.02 | 0.055 | 0.0010 | 0.0035 | 0.0011 | 0.043 | | |

| | Chemical composition (mass %) Balance: Iron and impurities | | | | | | | Ac3 | Ms | |
|---|---|---|---|---|---|---|---|---|---|---|
| | Ni | Co | W | Sn | Sb | V | Nb | Others | °C. | °C. Notes |
| A | | | | | | | 0.01 | | 852 | 405 Example |
| B | | | | | | | | | 839 | 389 Example |
| C | | 0.17 | 0.11 | | | | | Ca: 0.0021 | 862 | 396 Example |
| D | 0.06 | | | | | | | | 844 | 400 Example |
| E | 0.03 | | | | | | 0.01 | Zr: 0.0045 | 843 | 419 Example |
| F | | | | | | | | Hf: 0.0053 | 843 | 408 Example |
| G | | | | 0.12 | 0.07 | | | Ce: 0.0030 | 896 | 402 Example |
| H | | | | | | 0.26 | 0.03 | Bi: 0.0050 | 869 | 413 Example |
| I | 0.09 | | | | | | | Mg: 0.0045 | 838 | 401 Example |
| J | 0.12 | | | | | | | REM: 0.0038 | 817 | 374 Example |
| K | 0.11 | | | | | | | La: 0.0036 | 815 | 349 Example |
| L | | | | | | | | | 834 | 380 Example |
| M | | | | | | | | | 835 | 376 Comparaive Example |
| N | | | | | | | | | 880 | 399 Comparaive Example |
| O | | | | | | | | | 816 | 342 Comparaive Example |
| P | | | | | | | | | 859 | 400 Comparaive Example |
| Q | | | | | | | | | 856 | 404 Comparaive Example |
| R | | | | | | | | | 860 | 423 Comparaive Example |
| S | | | | | | | | | 847 | 399 Comparaive Example |
| T | | | | | | | | | 840 | 400 Comparaive Example |

The shaded area means outside the scope of the present disclosure.
Ti* = Ti − (47.88/14.01) · N

TABLE 2-1

| | | Casting | | Hot rolling | | | | | Cold rolling |
|---|---|---|---|---|---|---|---|---|---|
| Experimental example | Chemical composition | Average cooling rate to 1000° C. ° C./second | Vertical portion elapsed time second | Steel slab heating temperature ° C. | $T_{TiSB1}$ ° C. | Rolling ratio at or below $T_{TiSB1}$ % | Finish rolling temperature ° C. | Winding temperature ° C. | Cold rolling ratio % |
| 1 | A | 4.0 | 125 | 1260 | 986 | 52 | 930 | 520 | 53 |
| 2 | A | 0.6 | 167 | 1240 | 986 | 30 | 950 | 520 | 53 |
| 3 | A | 4.2 | 55 | 1240 | 986 | 57 | 930 | 550 | 53 |
| 4 | A | 4.0 | 125 | 1240 | 986 | 93 | 890 | 540 | 53 |
| 5 | A | 4.0 | 125 | 1250 | 986 | 37 | 950 | 490 | 0 |
| 6 | A | 0.4 | 250 | 1240 | 986 | 79 | 900 | 500 | 53 |
| 7 | A | 6.7 | 30 | 1240 | 986 | 42 | 950 | 530 | 53 |
| 8 | A | 5.0 | 100 | 1250 | 986 | 96 | 870 | 520 | 53 |
| 9 | A | 5.0 | 100 | 1150 | 986 | 62 | 910 | 540 | 53 |
| 10 | A | 4.3 | 115 | 1230 | 986 | 23 | 960 | 510 | 53 |
| 11 | A | 3.7 | 136 | 1250 | 986 | 62 | 920 | 520 | 53 |
| 12 | A | 4.3 | 115 | 1230 | 986 | 26 | 960 | 510 | 53 |
| 13 | A | 4.3 | 115 | 1250 | 986 | 45 | 940 | 460 | 53 |
| 14 | A | 4.0 | 125 | 1250 | 986 | 48 | 930 | 500 | 53 |
| 15 | A | 4.0 | 125 | 1260 | 986 | 50 | 930 | 530 | 53 |
| 16 | A | 3.7 | 136 | 1250 | 986 | 38 | 940 | 520 | 53 |
| 17 | A | 4.3 | 115 | 1240 | 986 | 54 | 920 | 500 | 53 |
| 18 | A | 4.3 | 115 | 1240 | 986 | 53 | 920 | 500 | 53 |
| 19 | B | 2.4 | 108 | 1250 | 964 | 40 | 930 | 540 | 53 |
| 20 | B | 2.4 | 108 | 1250 | 964 | 37 | 930 | 540 | 53 |
| 21 | B | 2.4 | 108 | 1240 | 964 | 87 | 880 | 470 | 53 |
| 22 | B | 2.4 | 108 | 1260 | 964 | 0 | 970 | 550 | 53 |
| 23 | B | 2.0 | 108 | 1250 | 964 | 24 | 950 | 480 | 25 |
| 24 | C | 2.4 | 108 | 1230 | 1001 | 49 | 950 | 500 | 53 |
| 25 | D | 2.8 | 106 | 1250 | 993 | 40 | 960 | 470 | 53 |
| 26 | D | 3.3 | 90 | 1260 | 993 | 19 | 980 | 520 | 53 |
| 27 | D | 1.7 | 180 | 1240 | 993 | 55 | 940 | 500 | 67 |
| 28 | E | 1.5 | 200 | 1240 | 984 | 31 | 950 | 530 | 53 |
| 29 | E | 1.5 | 200 | 1240 | 984 | 31 | 950 | 530 | 53 |
| 30 | F | 3.3 | 90 | 1230 | 1012 | 70 | 950 | 560 | 53 |
| 31 | G | 1.5 | 200 | 1240 | 978 | 39 | 950 | 540 | 53 |

TABLE 2-1-continued

| | | Casting | | Hot rolling | | | | | Cold rolling |
|---|---|---|---|---|---|---|---|---|---|
| Experimental example | Chemical composition | Average cooling rate to 1000° C. ° C./second | Vertical portion elapsed time second | Steel slab heating temperature ° C. | $T_{TiSB1}$ ° C. | Rolling ratio at or below $T_{TiSB1}$ % | Finish rolling temperature ° C. | Winding temperature ° C. | Cold rolling ratio % |
| 32 | H | 3.6 | 82 | 1270 | 1015 | 42 | 980 | 520 | 53 |
| 33 | I | 4.0 | 75 | 1240 | 1031 | 70 | 960 | 600 | 53 |
| 34 | J | 2.2 | 139 | 1260 | 1019 | 70 | 950 | 590 | 53 |
| 35 | K | 2.2 | 139 | 1250 | 968 | 18 | 950 | 620 | 53 |
| 36 | L | 2.8 | 106 | 1230 | 1003 | 50 | 960 | 570 | 53 |
| 37 | M | 2.8 | 106 | 1250 | 979 | 18 | 960 | 560 | 53 |
| 38 | N | 2.7 | 113 | 1250 | 1041 | 66 | 990 | 590 | 53 |
| 39 | O | 1.7 | 180 | 1240 | 1005 | 62 | 950 | 580 | 53 |
| 40 | P | 2.8 | 106 | 1260 | 925 | 0 | 950 | 530 | 53 |
| 41 | Q | 2.8 | 106 | 1280 | 1001 | 33 | 970 | 550 | 53 |
| 42 | R | 2.5 | 200 | 1230 | 993 | 50 | 950 | 540 | 53 |
| 43 | S | 2.5 | 200 | 1250 | — | 0 | 960 | 550 | 53 |
| 44 | T | 2.5 | 200 | 1260 | 1052 | 84 | 960 | 520 | 53 |
| 45 | A | 4.0 | 125 | 1260 | 986 | 52 | 930 | 520 | 53 |

The shaded area means outside the scope of the present disclosure.

TABLE 2-2

| | Continuous annealing | | | | | | | | | |
|---|---|---|---|---|---|---|---|---|---|---|
| | Heating step | | | | Primary cooling step | | Secondary cooling step | | Low-temperature holding step | |
| Experimental example | Maximum heating temperature ° C. | Holding time second | Dew point ° C. | H2 concentration volume % | Stop temperature ° C. | Cooling rate* ° C./second | Stop temperature ° C. | Cooling rate ° C./second | Holding temperature ° C. | Holding time second |
| 1 | 870 | 110 | −37 | 2.5 | 370 | 59 | 140 | 13 | 260 | 330 |
| 2 | 870 | 110 | −34 | 2.6 | 350 | 59 | 160 | 12 | 250 | 330 |
| 3 | 870 | 110 | −35 | 2.5 | 360 | 60 | 160 | 13 | 250 | 330 |
| 4 | 930 | 110 | −38 | 2.5 | 360 | 56 | 180 | 11 | 260 | 330 |
| 5 | 870 | 110 | −36 | 2.8 | 370 | 57 | 180 | 13 | 260 | 330 |
| 6 | 890 | 110 | −35 | 2.4 | 370 | 56 | 170 | 14 | 250 | 330 |
| 7 | 880 | 110 | −35 | 2.7 | 360 | 61 | 170 | 13 | 250 | 330 |
| 8 | 880 | 110 | −39 | 2.3 | 370 | 60 | 190 | 12 | 240 | 330 |
| 9 | 880 | 110 | −36 | 2.6 | 360 | 57 | 180 | 14 | 250 | 330 |
| 10 | 870 | 110 | −32 | 3.1 | 320 | 55 | 40 | 18 | 250 | 330 |
| 11 | 870 | 110 | −33 | 2.8 | 380 | 58 | 180 | 55 | 260 | 330 |
| 12 | 870 | 110 | −32 | 3.1 | 390 | 32 | 280 | 7 | 250 | 330 |
| 13 | 880 | 110 | −36 | 2.9 | 450 | 59 | 200 | 10 | 280 | 330 |
| 14 | 870 | 110 | −36 | 3.0 | 360 | 57 | 150 | 12 | 350 | 330 |
| 15 | 830 | 110 | −38 | 2.7 | 360 | 58 | 180 | 14 | 250 | 330 |
| 16 | 880 | 110 | −35 | 2.7 | 380 | 19 | 180 | 15 | 260 | 330 |
| 17 | 880 | 110 | −30 | 3.5 | 350 | 55 | 170 | 14 | 250 | 70 |
| 18 | 880 | 110 | −30 | 3.5 | 350 | 55 | 170 | 14 | 250 | 165 |
| 19 | 860 | 110 | −39 | 2.3 | 350 | 60 | 180 | 11 | 300 | 330 |
| 20 | 870 | 110 | −40 | 2.5 | 340 | 62 | 170 | 10 | 170 | 330 |
| 21 | 880 | 110 | −40 | 2.4 | 340 | 65 | 180 | 10 | 260 | 330 |
| 22 | 880 | 110 | −37 | 2.0 | 360 | 59 | 180 | 10 | 260 | 330 |
| 23 | 870 | 110 | −38 | 2.6 | 300 | 60 | 200 | 9 | 250 | 330 |
| 24 | 880 | 110 | −35 | 2.9 | 350 | 51 | 200 | 8 | 260 | 330 |
| 25 | 890 | 110 | −36 | 1.9 | 310 | 70 | 170 | 10 | 260 | 330 |
| 26 | 880 | 110 | −34 | 2.2 | 360 | 98 | 50 | 80 | 240 | 330 |
| 27 | 880 | 110 | −34 | 2.0 | 360 | 98 | 190 | 10 | 250 | 330 |
| 28 | 860 | 110 | −33 | 2.0 | 370 | 53 | 180 | 15 | 240 | 330 |
| 29 | 870 | 110 | −33 | 2.0 | 380 | 53 | 190 | 0.2 | 250 | 330 |
| 30 | 860 | 110 | −38 | 2.6 | 360 | 50 | 110 | 17 | 230 | 330 |
| 31 | 900 | 110 | −33 | 2.1 | 350 | 54 | 200 | 6 | 250 | 330 |
| 32 | 890 | 110 | −35 | 2.3 | 390 | 35 | 180 | 15 | 200 | 330 |
| 33 | 840 | 220 | −33 | 2.0 | 380 | 32 | 200 | 4 | 290 | 660 |
| 34 | 850 | 110 | −35 | 2.2 | 330 | 64 | 190 | 10 | 230 | 330 |
| 35 | 860 | 110 | −39 | 2.5 | 300 | 57 | 130 | 15 | 210 | 330 |
| 36 | 860 | 110 | −35 | 2.4 | 350 | 58 | 190 | 9 | 240 | 330 |
| 37 | 870 | 110 | −38 | 2.5 | 340 | 64 | 180 | 9 | 250 | 330 |
| 38 | 900 | 110 | −39 | 2.7 | 380 | 50 | 200 | 7 | 260 | 330 |
| 39 | 850 | 110 | −34 | 2.3 | 350 | 62 | 170 | 10 | 270 | 330 |
| 40 | 870 | 110 | −33 | 1.8 | 390 | 60 | 180 | 11 | 250 | 330 |
| 41 | 870 | 110 | −35 | 2.0 | 360 | 52 | 160 | 12 | 250 | 330 |

TABLE 2-2-continued

| | Continuous annealing | | | | | | | | | |
|---|---|---|---|---|---|---|---|---|---|---|
| | Heating step | | | | Primary cooling step | | Secondary cooling step | | Low-temperature holding step | |
| Experimental example | Maximum heating temperature ° C. | Holding time second | Dew point ° C. | H2 concentration volume % | Stop temperature ° C. | Cooling rate* ° C./second | Stop temperature ° C. | Cooling rate ° C./second | Holding temperature ° C. | Holding time second |
| 42 | 880 | 110 | −40 | 1.6 | 370 | 55 | 190 | 10 | 250 | 330 |
| 43 | 870 | 110 | −35 | 2.4 | 370 | 58 | 170 | 11 | 250 | 330 |
| 44 | 890 | 110 | −36 | 2.8 | 370 | 61 | 200 | 9 | 250 | 330 |
| 45 | 870 | 110 | −37 | 2.5 | 370 | 59 | 140 | 13 | 260 | Slow cooling** |

The shaded area means outside the scope of the present disclosure.
*Average cooling rate at temperatures between 400 and 700° C.
**Cooled to 150° C. at 3° C./s

TABLE 3-1

| | | | Microstructure | | | | | Number density of inclusions (maximum diameter ≥ 3 μm) | |
|---|---|---|---|---|---|---|---|---|---|---|
| | | | | | | Martensite | | | |
| Experimental example | Chemical composition | Surface | Ferrite area % | Bainite area % | Retained γ area % | area % | Tempered ratio area % | $\frac{V\gamma'}{V\gamma}$ | Average inclusion/mm$^2$ | Top 10% section inclusion/mm$^2$ |
| 1 | A | CR | 0 | 0 | 3.5 | 96.5 | 95 | 0.4 | 19 | 33 |
| 2 | A | CR | 0 | 0 | 3.7 | 96.3 | 95 | 0.4 | 22 | 78 |
| 3 | A | CR | 0 | 0 | 3.6 | 96.4 | 95 | 0.5 | 37 | 74 |
| 4 | A | CR | 0 | 0 | 4.0 | 96.0 | 90 | 0.5 | 40 | 72 |
| 5 | A | CR | 0 | 0 | 3.0 | 97.0 | 95 | 0.7 | 15 | 27 |
| 6 | A | CR | 0 | 0 | 4.0 | 96.0 | 90 | 0.5 | 28 | 102 |
| 7 | A | CR | 0 | 0 | 4.0 | 96.0 | 90 | 0.5 | 51 | 77 |
| 8 | A | CR | 0 | 0 | 3.8 | 96.2 | 90 | 0.5 | 49 | 85 |
| 9 | A | CR | 0 | 0 | 3.9 | 96.1 | 90 | 0.6 | 45 | 88 |
| 10 | A | CR | 0 | 0 | 0.4 | 99.6 | 100 | — | 20 | 36 |
| 11 | A | CR | 0 | 0 | 2.0 | 98.0 | 95 | 0 | 18 | 30 |
| 12 | A | CR | 0 | 6 | 3.8 | 90.2 | 80 | 0.6 | 16 | 32 |
| 13 | A | CR | 0 | 10 | 4.7 | 85.3 | 80 | 0.4 | 20 | 41 |
| 14 | A | CR | 0 | 0 | 0.0 | 100.0 | 95 | — | 17 | 34 |
| 15 | A | CR | 19 | 0 | 4.0 | 77.0 | 90 | 0.7 | 22 | 36 |
| 16 | A | CR | 0 | 8 | 4.2 | 87.8 | 90 | 0.5 | 21 | 39 |
| 17 | A | CR | 0 | 0 | 4.0 | 96.0 | 85 | 0.05 | 18 | 38 |
| 18 | A | CR | 0 | 0 | 4.0 | 96.0 | 85 | 0.1 | 18 | 38 |
| 19 | B | CR | 0 | 0 | 1.0 | 99.0 | 100 | 0.2 | 17 | 30 |
| 20 | B | CR | 0 | 0 | 3.9 | 96.1 | 50 | 0 | 18 | 29 |
| 21 | B | CR | 0 | 0 | 4.2 | 95.8 | 90 | 0.5 | 36 | 75 |
| 22 | B | CR | 0 | 0 | 4.2 | 95.8 | 90 | 0.5 | 10 | 18 |
| 23 | B | CR | 0 | 0 | 4.4 | 95.6 | 90 | 0.5 | 19 | 33 |
| 24 | C | CR | 0 | 0 | 4.5 | 95.5 | 90 | 0.8 | 20 | 35 |
| 25 | D | CR | 0 | 0 | 4.1 | 95.9 | 95 | 0.8 | 13 | 25 |
| 26 | D | CR | 0 | 0 | 0.4 | 99.6 | 100 | — | 10 | 19 |
| 27 | D | EG | 0 | 0 | 3.9 | 96.1 | 95 | 0.7 | 15 | 28 |
| 28 | E | CR | 0 | 0 | 3.2 | 96.8 | 95 | 0.7 | 18 | 30 |
| 29 | E | CR | 0 | 10 | 4.9 | 85.1 | 90 | 0.6 | 13 | 25 |
| 30 | F | CR | 0 | 4 | 1.0 | 95.0 | 100 | 0.5 | 16 | 41 |
| 31 | G | CR | 4 | 1 | 4.8 | 90.2 | 90 | 0.7 | 22 | 34 |
| 32 | H | CR | 0 | 0 | 4.2 | 95.8 | 80 | 0.1 | 24 | 45 |
| 33 | I | CR | 0 | 9 | 0.7 | 90.3 | 90 | 0.2 | 16 | 25 |
| 34 | J | CR | 0 | 0 | 3.7 | 96.3 | 90 | 0.5 | 21 | 32 |
| 35 | K | CR | 0 | 0 | 4.8 | 95.2 | 85 | 0.3 | 15 | 37 |
| 36 | L | CR | 0 | 0 | 4.6 | 95.4 | 90 | 0.2 | 28 | 51 |
| 37 | M | CR | 0 | 0 | 5.3 | 94.7 | 90 | 0.3 | 34 | 65 |
| 38 | N | CR | 0 | 0 | 6.8 | 93.2 | 90 | 0.6 | 18 | 37 |
| 39 | O | CR | 0 | 0 | 5.5 | 94.5 | 90 | 0.4 | 21 | 35 |
| 40 | P | CR | 12 | 7 | 4.2 | 76.8 | 85 | 0.4 | 8 | 13 |
| 41 | Q | CR | 16 | 4 | 3.9 | 76.1 | 85 | 0.5 | 16 | 37 |
| 42 | R | CR | 0 | 0 | 2.8 | 97.2 | 90 | 0.5 | 23 | 48 |
| 43 | S | CR | 8 | 5 | 3.5 | 83.5 | 90 | 0.4 | 6 | 10 |

TABLE 3-1-continued

| | | | | | | Microstructure | | | Number density of inclusions (maximum diameter ≥ 3 μm) | |
| --- | --- | --- | --- | --- | --- | --- | --- | --- | --- | --- |
| | | | | | | | Martensite | | | |
| Experimental example | Chemical composition | Surface | Ferrite area % | Bainite area % | Retained γ area % | area % | Tempered ratio area % | $\frac{V\gamma'}{V\gamma}$ | Average inclusion/mm² | Top 10% section inclusion/mm² |
| 44 | T | CR | 0 | 0 | 4.0 | 96.0 | 85 | 0.6 | 46 | 90 |
| 45 | A | CR | 0 | 0 | 2.5 | 97.5 | 80 | 0 | 18 | 30 |

The shaded area means outside the scope of the present disclosure.

TABLE 3-2

| | Mechanical properties | | | | Hydrogen embrittlement resistance OK: No cracking occurred NG: Cracking occurred | | | |
| --- | --- | --- | --- | --- | --- | --- | --- | --- |
| Experimental example | TS MPa | El % | λ % | R mm | Hydrochloric acid 1N | Hydrochloric acid 0.1N | Hydrochloric acid 0.01N | Notes |
| 1 | 1490 | 8.5 | 53 | 2 | OK | OK | OK | Present invention |
| 2 | 1497 | 8.1 | 45 | 3 | NG | NG | OK | Present invention |
| 3 | 1500 | 8.2 | 43 | 3 | NG | NG | OK | Present invention |
| 4 | 1491 | 8.6 | 44 | 3 | NG | NG | OK | Present invention |
| 5 | 1493 | 8.8 | 59 | 2 | OK | OK | OK | Present invention |
| 6 | 1497 | 8.7 | 39 | 4 | NG | NG | NG | Comparative Example |
| 7 | 1494 | 8.6 | 35 | 4 | NG | NG | NG | Comparative Example |
| 8 | 1502 | 8.8 | 32 | 5 | NG | NG | NG | Comparative Example |
| 9 | 1474 | 8.7 | 31 | 4 | NG | NG | NG | Comparative Example |
| 10 | 1516 | 5.6 | 60 | 4 | NG | OK | OK | Comparative Example |
| 11 | 1512 | 7.5 | 57 | 2 | NG | NG | NG | Comparative Example |
| 12 | 1501 | 9.1 | 35 | 2 | NG | OK | OK | Present invention |
| 13 | 1442 | 7.9 | 38 | 3 | NG | NG | NG | Comparative Example |
| 14 | 1408 | 5.1 | 65 | 3 | NG | NG | NG | Comparative Example |
| 15 | 1433 | 9.4 | 40 | 3 | NG | NG | NG | Comparative Example |
| 16 | 1459 | 8.9 | 41 | 3 | NG | NG | NG | Comparative Example |
| 17 | 1541 | 8.5 | 38 | 4 | NG | NG | NG | Comparative Example |
| 18 | 1541 | 8.5 | 38 | 4 | NG | NG | OK | Present invention |
| 19 | 1471 | 6.1 | 58 | 3 | OK | OK | OK | Present invention |
| 20 | 1556 | 7.7 | 30 | 3 | NG | NG | NG | Comparative Example |
| 21 | 1493 | 8.0 | 32 | 3 | NG | NG | OK | Present invention |
| 22 | 1499 | 8.1 | 47 | 3 | OK | OK | OK | Present invention |
| 23 | 1501 | 8.5 | 40 | 3 | OK | OK | OK | Present invention |
| 24 | 1523 | 9.4 | 48 | 3 | NG | OK | OK | Present invention |
| 25 | 1517 | 8.9 | 57 | 2 | OK | OK | OK | Present invention |
| 26 | 1530 | 5.4 | 55 | 3 | NG | OK | OK | Comparative Example |
| 27 | 1524 | 7.9 | 53 | 3 | OK | OK | OK | Present invention |
| 28 | 1471 | 8.2 | 50 | 2 | OK | OK | OK | Present invention |
| 29 | 1447 | 8.3 | 38 | 3 | OK | OK | OK | Comparative Example |
| 30 | 1477 | 7.6 | 43 | 3 | NG | OK | OK | Present invention |
| 31 | 1483 | 9.5 | 38 | 3 | NG | OK | OK | Present invention |
| 32 | 1505 | 8.5 | 33 | 3 | NG | NG | OK | Present invention |
| 33 | 1523 | 6.2 | 54 | 3 | NG | OK | OK | Present invention |
| 34 | 1690 | 7.8 | 41 | 3 | NG | OK | OK | Present invention |
| 35 | 1812 | 7.1 | 30 | 4 | NG | NG | OK | Present invention |
| 36 | 1510 | 8.4 | 39 | 4 | NG | NG | OK | Present invention |
| 37 | 1506 | 9.0 | 33 | 4 | NG | NG | NG | Comparative Example |
| 38 | 1509 | 10.2 | 35 | 4 | NG | NG | NG | Comparative Example |
| 39 | 1661 | 7.0 | 29 | 5 | NG | NG | NG | Comparative Example |
| 40 | 1374 | 7.9 | 35 | 4 | NG | OK | OK | Comparative Example |
| 41 | 1398 | 7.2 | 28 | 4 | NG | OK | OK | Comparative Example |
| 42 | 1380 | 9.0 | 62 | 2 | OK | OK | OK | Comparative Example |
| 43 | 1403 | 7.5 | 45 | 3 | OK | OK | OK | Comparative Example |
| 44 | 1480 | 8.1 | 30 | 4 | NG | NG | NG | Comparative Example |
| 45 | 1529 | 7.7 | 40 | 3 | NG | NG | NG | Comparative Example |

From the above results, it can be seen that the steel sheet in Experimental Example as an example of the disclosure has excellent hydrogen embrittlement resistance of the sheared portion while having a tensile strength of 1470 MPa or more and high total elongation.

On the other hand, Experimental Example 6 (Comparative Example) is an example in which the average cooling rate is low until the surface temperature of the central portion in the width direction of the steel slab first reaches 1000° C. or lower in the casting step. In Experimental Example 6 (Comparative Example), the number density in the section where the number density of inclusions was in the top 10% was increased, and hydrogen embrittlement resistance was deteriorated.

Experimental Example 7 (Comparative Example) is an example in which the elapsed time until the steel slab reaches the bending start portion from the exit side of the mold is short in the casting step. In Experimental Example 7 (Comparative Example), together with the number density of inclusions, the number density in the section where the number density of inclusions was in the top 10% was increased, and hydrogen embrittlement resistance was deteriorated.

Experimental Example 8 (Comparative Example) is an example in which the rolling ratio is high at or below the temperature $T_{TiSB1}$ represented by Formula (B1) in the hot rolling step. In Experimental Example 8 (Comparative Example), together with the number density of inclusions, the number density in the section where the number density of inclusions was in the top 10% was increased, and hydrogen embrittlement resistance was deteriorated.

Experimental Example 9 (Comparative Example) is an example in which the slab heating temperature is low in the hot rolling step. In Experimental Example 9 (Comparative Example), together with the number density of inclusions, the number density in the section where the number density of inclusions was in the top 10% was increased, and hydrogen embrittlement resistance was deteriorated.

Experimental Example 10 (Comparative Example) is an example in which the secondary cooling stop temperature is low in the secondary cooling step. In Experimental Example 10 (Comparative Example), the area ratio of retained austenite was low, and the total elongation (El) was deteriorated.

Experimental Example 11 (comparative example) is an example in which the average cooling rate during the period from stop of the primary cooling to stop of the secondary cooling is high in the secondary cooling step. In Experimental Example 11 (Comparative Example), Formula (A) was not satisfied, and hydrogen embrittlement resistance was deteriorated.

Experimental Example 13 (Comparative Example) is an example in which the primary cooling temperature is high in the primary cooling step. In Experimental Example 13 (Comparative Example), the area ratio of bainite was high, the area ratio of martensite was low, and the tensile strength (TS) and hydrogen embrittlement resistance were deteriorated.

Experimental Example 14 (Comparative Example) is an example in which the holding temperature is high in the low-temperature holding step. In Experimental Example 14 (Comparative Example), the area ratio of retained austenite was low, and the tensile strength (TS), the total elongation (El), and the hydrogen embrittlement resistance were deteriorated.

Experimental Example 15 (Comparative Example) is an example in which the maximum heating temperature in the continuous annealing step is low. In Experimental Example 15 (Comparative Example), the area ratio of ferrite was high, the area ratio of martensite was low, the tensile strength (TS) and the hydrogen embrittlement resistance were deteriorated.

Experimental Example 16 (Comparative Example) is an example in which the average cooling rate is low in the primary cooling step. In Experimental Example 16 (Comparative Example), the area ratio of bainite was high, the area ratio of martensite was low, and the tensile strength (TS) and hydrogen embrittlement resistance were deteriorated.

Experimental Example 17 (Comparative Example) is an example in which the holding time is short in the low-temperature holding step. In Experimental Example 17 (Comparative Example), Formula (A) was not satisfied, and hydrogen embrittlement resistance was deteriorated.

Experimental Example 20 (Comparative Example) is an example in which the holding temperature is low in the low-temperature holding step. In Experimental Example 20 (Comparative Example), Formula (A) was not satisfied, and hydrogen embrittlement resistance was deteriorated.

Experimental Example 26 (Comparative Example) is an example in which the cooling stop temperature is low and the average cooling rate is high in the secondary cooling step. In Experimental Example 26 (Comparative Example), the area ratio of retained austenite was low, and the total elongation (El) was deteriorated.

Experimental Example 29 (Comparative Example) is an example in which the average cooling rate is low in the secondary cooling step. In Experimental Example 29 (Comparative Example), the area ratio of bainite was high, the area ratio of martensite was low, and the tensile strength (TS) and hydrogen embrittlement resistance were deteriorated.

Experimental Examples 37 to 44 (Comparative Examples) are examples in which the chemical composition of the steel sheet does not satisfy the chemical composition of the disclosure. In Experimental Examples 37 to 44 (Comparative Examples), the tensile strength (TS) was deteriorated, or hydrogen embrittlement resistance was deteriorated.

Experimental Example 45 (Comparative Example) is an example in which slow cooling was performed from 260° C. to 150° C. at 3° C./s instead of low-temperature holding in the continuous annealing step. In Experimental Example 45 (Comparative Example), Formula (A) was not satisfied, and hydrogen embrittlement resistance was deteriorated.

The reference signs will be described as follows.
10 Continuous casting facility
11 Vertical portion from exit side of mold to bending start portion
12 Bent portion
20 Mold
30 Immersion nozzle for supplying molten steel to mold
31 Discharge port of molten steel of immersion nozzle
40 Support roll
50 Steel slab The disclosure of Japanese Patent Application No. 2019-160683 is incorporated herein by reference in its entirety.

All documents, patent applications, and technical standards described in this specification are incorporated herein by reference to the same extent as if each individual document, patent application, and technical standard were specifically and individually indicated to be incorporated by reference.

The invention claimed is:

1. A steel sheet comprising a chemical composition that contains, in mass %:
C: 0.18% to 0.35%,
Si: 0.01% to 1.00%,
Mn: 0.10% to 2.40%,
P: 0.050% or less,
S: 0.0050% or less,
Al: 0.001% to 1.00%,
Ti: 0.001% to 0.050%,
B: 0.0005% to 0.0050%,
N: 0.0100% or less,
O: 0.0050% or less,
Cr: 0% to 1.00%,
Mo: 0% to 0.50%, Cu: 0% to 0.50%,
Ni: 0% to 0.50%,
Co: 0% to 0.50%,
W: 0% to 0.50%,
Sn: 0% to 0.50%,
Sb: 0% to 0.50%,
Nb: 0% to 0.050%,
V: 0% to 0.50%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%,
REM: 0% to 0.0100%, and
a balance consisting of Fe and impurities, and
that satisfies the Formula: $0.001 \leq \text{Ti} - (47.88/14.01) \times \text{N} \leq 0.040$, wherein each element symbol represents mass % of the corresponding element, and
a steel structure in a cross section in a rolling direction of a steel sheet and in a range of ⅛ thickness to ⅜ thickness centered on ¼ thickness from a surface of the steel sheet,
that contains, in area ratio %,
ferrite: 0 to 5%,
martensite: 90.0 to 99.5%,
a ratio of tempered martensite to total martensite: 80.0 to 100.0%, and
retained austenite: 0.5 to 6.0%,
and
in a measurement region defined by a range of ⅛ thickness to ⅞ thickness from the surface of the steel sheet×25 mm in the cross section in the rolling direction of the steel sheet, a number density of inclusions satisfying a maximum diameter≥3 μm is 40 inclusions/mm² or less,
when the measurement region is divided into 100 sections obtained by dividing the measurement region into 2 sections in a thickness direction and 50 sections in a width direction, and the number density of the inclusions satisfying the maximum diameter≥3 μm in each section is calculated, the number density in a section where the number density of inclusions is in a top 10% is from 2 inclusions/mm² to 80 inclusions/mm²,
the following Formula (A) is satisfied, and
a tensile strength is 1470 MPa or more:

$$V\gamma'/V\gamma \geq 0.1 \quad (A),$$

wherein Vγ: area ratio of initial retained austenite, Vγ': area ratio of retained austenite after deep cooling at −196° C.

2. The steel sheet according to claim 1, wherein the number density of inclusions satisfying the maximum diameter≥3 μm is 30 inclusions/mm² or less in the measurement region.

3. The steel sheet according to claim 2, wherein the number density in the section where the number density of inclusions is in the top 10% is 60 inclusions/mm² or less.

4. The steel sheet according to claim 2, satisfying the following Formula (A2):

$$V\gamma'/V\gamma \geq 0.2 \quad (A2),$$

wherein Vγ: area ratio of initial retained austenite, Vγ': area ratio of retained austenite after deep cooling at −196° C.

5. The steel sheet according to claim 1, wherein the number density in the section where the number density of inclusions is in the top 10% is 60 inclusions/mm² or less.

6. The steel sheet according to claim 5, satisfying the following Formula (A2):

$$V\gamma'/V\gamma \geq 0.2 \quad (A2),$$

wherein Vγ: area ratio of initial retained austenite, Vγ': area ratio of retained austenite after deep cooling at −196° C.

7. The steel sheet according to claim 1, satisfying the following Formula (A2):

$$V\gamma'/V\gamma \geq 0.2 \quad (A2),$$

wherein Vγ: area ratio of initial retained austenite, Vγ': area ratio of retained austenite after deep cooling at −196° C.

* * * * *